United States Patent
Huang et al.

(10) Patent No.: US 10,678,648 B2
(45) Date of Patent: Jun. 9, 2020

(54) METHOD, APPARATUS, AND SYSTEM FOR MIGRATING VIRTUAL MACHINE BACKUP INFORMATION

(71) Applicant: HUAWEI TECHNOLOGIES CO., LTD., Shenzhen, Guangdong (CN)

(72) Inventors: Heng Huang, Chengdu (CN); Lei Zhang, Chengdu (CN); Hua Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 15/614,985

(22) Filed: Jun. 6, 2017

(65) Prior Publication Data

US 2017/0270007 A1    Sep. 21, 2017

Related U.S. Application Data

(63) Continuation of application No. PCT/CN2015/096361, filed on Dec. 3, 2015.

(51) Int. Cl.
*G06F 11/14* (2006.01)
*G06F 9/455* (2018.01)
(Continued)

(52) U.S. Cl.
CPC ........ *G06F 11/1448* (2013.01); *G06F 3/0647* (2013.01); *G06F 9/455* (2013.01);
(Continued)

(58) Field of Classification Search
CPC ......... G06F 11/1448; G06F 2009/4557; G06F 3/0647; G06F 9/455; G06F 9/45558; H04L 67/148
See application file for complete search history.

(56) References Cited

U.S. PATENT DOCUMENTS

| 7,917,617 B1 * | 3/2011 | Ponnapur | G06F 9/45558 711/6 |
| 2012/0185856 A1 * | 7/2012 | Ashihara | G06F 9/4856 718/1 |

(Continued)

FOREIGN PATENT DOCUMENTS

| CN | 102317910 A | 1/2012 |
| CN | 102646064 A | 8/2012 |

(Continued)

*Primary Examiner* — Baboucarr Faal
*Assistant Examiner* — Jane Wei
(74) *Attorney, Agent, or Firm* — Leydig, Voit & Mayer, Ltd.

(57) ABSTRACT

A method, an apparatus, and a system for migrating virtual machine backup information, which implement backup information migration after a virtual machine is migrated. The method includes: receiving, by a first backup server, a migration trigger message, where the migration trigger message carries pre-migration virtual-machine identification information and indication information of a second backup server; determining, by the first backup server, backup information of the virtual machine according to the pre-migration virtual-machine identification information; and sending, by the first backup server, the backup information to the second backup server. Therefore, the migrated virtual machine inherits backup information existing before the migration, such that the migrated virtual machine continues to be protected by backup data existing before the migration, and data of the virtual machine is backed up according to a backup policy existing before the migration.

20 Claims, 9 Drawing Sheets

(51) Int. Cl.
*G06F 3/06* (2006.01)
*H04L 29/08* (2006.01)
(52) U.S. Cl.
CPC .. *G06F 9/45558* (2013.01); *G06F 2009/4557* (2013.01); *H04L 67/148* (2013.01)

(56) References Cited

U.S. PATENT DOCUMENTS

| | | | |
|---|---|---|---|
| 2012/0209812 A1 | 8/2012 | Bezbaruah et al. | |
| 2013/0091334 A1 | 4/2013 | Yu et al. | |
| 2015/0052282 A1* | 2/2015 | Dong | G06F 13/32 |
| | | | 710/308 |

FOREIGN PATENT DOCUMENTS

| | | |
|---|---|---|
| CN | 103647849 A | 3/2014 |
| CN | 103678045 A | 3/2014 |
| CN | 104298553 A | 1/2015 |
| CN | 104468641 A | 3/2015 |
| EP | 2835953 A1 | 2/2015 |

\* cited by examiner

METHOD, APPARATUS, AND SYSTEM FOR MIGRATING VIRTUAL MACHINE BACKUP INFORMATION

CROSS-REFERENCE TO RELATED APPLICATIONS

This application is a continuation of International Application No. PCT/CN2015/096361, filed on Dec. 3, 2015, the disclosure of which is hereby incorporated by reference in its entirety.

TECHNICAL FIELD

Embodiments of the present disclosure relate to the computer field, and in particular, to a method, an apparatus, and a system for migrating virtual machine backup information.

BACKGROUND

With continuous development of IT technologies, currently, all mainstream cloud computing platforms support a virtual-machine migration feature. Virtual-machine migration refers to a process in which a virtual machine is migrated from one host or storage location to another host or storage location. A range of virtual-machine migration may be within a same data center, or may cross data centers. In a virtualization environment, for establishment of a virtual-machine data backup system, one or more backup servers are deployed generally according to a backup service size and a capacity of the backup server.

For a data center in which a virtual-machine backup system is established, each virtual machine is protected by a backup server in a region in which the virtual machine is located. If the virtual machine is migrated to a location outside the protection range of the backup server in which the virtual machine is originally located, the virtual machine faces a risk of losing backup protection.

Cross-data center virtual-machine migration is used as an example, where one backup server is deployed in both a first data center and a second data center to provide backup protection for a virtual machine. After a virtual machine in the first data center is migrated to the second data center, backup data of the virtual machine still remains in a backup storage of a first backup server of the first data center. After the virtual machine is migrated to a new location, if backup information is not migrated, a backup server in the new location is unable to automatically execute, for the virtual machine, a same backup plan as before the migration, and the backup data of the virtual machine before the migration cannot be inherited after the migration. As a result, the original backup data cannot be used for restoration after the virtual machine is migrated.

SUMMARY

In view of this, this application provides a method, an apparatus, and a system for migrating virtual machine backup information, so as to implement migration of backup information after a virtual machine is migrated.

After a virtual machine running on a first computing device is migrated by a migration management module to a second computing device, the technical solution disclosed in this application is used to implement migration of backup information of the virtual machine from a first backup server to a second backup server, where the first backup server is configured to back up data of a virtual machine running on the first computing device, and the second backup server is configured to back up data of a virtual machine running on the second computing device. The backup information includes backup data information or a backup policy, or a combination of the backup data information and the backup policy. If two virtual machine groups, in which the virtual machine is located before and after migration, share a storage device that is configured to store backup data, the backup data information may be address information of backup data of the virtual machine, in the storage device; or, if two virtual machine groups, in which the virtual machine is located before and after migration, do not share a storage device that is configured to store backup data, the backup data information is backup data of the virtual machine. The backup policy refers to any one or a combination of a backup-requiring object of the virtual machine, backup time, or a backup manner.

According to a first aspect, this application provides a method for migrating virtual machine backup information, including: receiving, by a first backup server, a migration trigger message, where the migration trigger message carries pre-migration virtual-machine identification information and indication information of a second backup server, and is used to instruct the first backup server to migrate backup information of a virtual machine to the second backup server; determining, by the first backup server, the backup information of the virtual machine according to the pre-migration virtual-machine identification information, and sending a backup information migration message to the second backup server, where the backup information migration message carries the backup information and virtual-machine identification information.

The pre-migration virtual-machine identification information in the migration trigger message is an identifier of the virtual machine on a first computing device. Identification information of the virtual machine changes after migration. For ease of description, in the following description, identification information of the virtual machine on the first computing device is referred to as the pre-migration virtual-machine identification information, and identification information of the virtual machine on a second computing device is post-migration virtual-machine identification information. The virtual-machine identification information in the backup information migration message may be the pre-migration virtual-machine identification information or the post-migration virtual-machine identification information.

With reference to the first aspect, in a first possible implementation manner of the first aspect, the migration trigger message received by the first backup server is a migration trigger message from the second backup server, and the migration trigger message is used to request the first backup server to send the backup information of the virtual machine to the second backup server. If the first computing device and the second computing device are located in a same data center, after migrating the virtual machine from the first computing device to the second computing device, a migration management module of the data center sends indication information of the first backup server and the pre-migration virtual-machine identification information to the second backup server. If the first computing device and the second computing device are respectively located in two different data centers, a first data center and a second data center, a migration management module of the first data center may send indication information of the first backup server and the pre-migration virtual-machine identification information of the virtual machine to a migration management module of the second data center, and the migration management module of the second data center sends the indication information of the first backup server and the pre-migration virtual-machine identification information of the virtual machine to the second backup server.

With reference to the first aspect, in a second possible implementation manner of the first aspect, the migration trigger message received by the first backup server is a migration trigger message from a migration management module, and the migration management module is configured to manage a migration operation of the virtual machine. If the first computing device and the second computing device belong to a same data center, after migrating the virtual machine to the second computing device, a migration management module of the data center sends the migration trigger message to the first backup server. If the first computing device and the second computing device belong to two different data centers, a first data center and a second data center, a migration management module of the first data center or a migration management module of the second data center may send the migration trigger message to the first backup server.

With reference to the first aspect or any one of the foregoing possible implementation manners of the first aspect, in a third possible implementation manner of the first aspect, the indication information of the second backup server is an identifier of the second computing device, and before sending the backup information migration message to the second backup server, the first backup server determines the second backup server according to the identifier of the second computing device and a first correspondence, where the first correspondence includes a correspondence between the second computing device and the second backup server.

With reference to the first aspect, in a fourth possible implementation manner of the first aspect, the migration trigger message received by the first backup server is a migration trigger message from a backup server management platform, and the backup server management platform is configured to manage backup information migration between the first backup server and the second backup server. If the first computing device and the second computing device belong to a same data center, a migration management module of the data center sends a migration notification message to the backup server management platform; or, if the first computing device and the second computing device belong to different data centers, a migration management module of a first data center or a second data center may send a migration notification message to the backup server management platform, where the migration notification message may carry an identifier of the first computing device, an identifier of the second computing device, and the pre-migration virtual-machine identification information. The backup server management platform determines the first backup server according to the identifier of the first computing device, determines the second backup server according to the identifier of the second computing device, and sends the migration trigger message to the first backup server.

With reference to the first aspect or any one of the foregoing possible implementation manners of the first aspect, in a fifth possible implementation manner of the first aspect, the backup information includes backup data information or a backup policy for the virtual machine, or a combination of the backup data information and the backup policy. If the first backup server and the second backup server share a storage device that is configured to store backup data of the virtual machine, the backup data information includes address information of the backup data of the virtual machine, in the storage device; or, if the first backup server and the second backup server do not share a storage device that is configured to store backup data of the virtual machine, the backup data information includes the backup data of the virtual machine.

If the first backup server and the second backup server share a storage device that is configured to back up data, only address information of the backup data of the virtual machine is located needs to be migrated, thereby reducing an amount of data transmitted.

With reference to the first aspect or any one of the foregoing possible implementation manners of the first aspect, in a sixth possible implementation manner of the first aspect, after sending the backup information migration message to the second backup server, the first backup server further receives a feedback message from the second backup server, where the feedback message is used to indicate completion of migration of the backup information. After receiving the feedback message from the second backup server, the first backup server may tear down a communications connection to the second backup server, so as to release a communication resource; and delete original virtual-machine backup information, so as to save a storage resource of the first backup server.

According to a second aspect, this application provides a computer readable medium, including a computer executable instruction, where when a processor of a computer executes the computer executable instruction, the computer executes the method in the first aspect or any one of the possible implementation manners of the first aspect.

According to a third aspect, this application provides a computing device, including: a processor, a memory, a bus, and a communications interface, where the memory is configured to store an executable instruction, the processor and the memory are connected using the bus, and when the computing device runs, the processor executes the executable instruction stored by the memory to make the computing device execute the method in the first aspect or any one of the possible implementation manners of the first aspect.

According to a fourth aspect, this application provides a method for migrating virtual machine backup information, including: receiving, by a second backup server, a backup information migration message from a first backup server, where the backup information migration message includes virtual-machine identification information and backup information of a virtual machine; and determining, by the second backup server, the virtual machine according to the virtual-machine identification information, and associating the virtual machine with the backup information.

With reference to the fourth aspect, in a first possible implementation manner of the fourth aspect, before the receiving, by a second backup server, a backup information migration message from a first backup server, the method further includes: receiving, by the second backup server, a notification message from a migration management module, where the notification message carries indication information of the first backup server and pre-migration virtual-machine identification information; and sending, by the second backup server, a migration trigger message to the first backup server, where the migration trigger message is used to request the first backup server to send the backup information of the virtual machine to the second backup server, and the migration trigger message carries the pre-migration virtual-machine identification information and indication information of the second backup server.

If a first computing device and a second computing device belong to a same data center, after migrating the virtual machine from the first computing device to the second computing device, a migration management module of the data center sends a notification message to the second backup server, where the notification message is used to notify that a new virtual machine is migrated to the second computing device managed by the second backup server; or if a first computing device and a second computing device respectively belong to two different data centers: a first data center and a second data center, a migration management module of the first data center or the second data center may send the notification message to the second backup server.

With reference to the fourth aspect or the first possible implementation manner of the fourth aspect, in a second possible implementation manner of the fourth aspect, the virtual-machine identification information is the pre-migration virtual-machine identification information; and the determining, by the second backup server, the virtual machine according to the virtual-machine identification information includes: determining, by the second backup server, post-migration virtual-machine identification information of the virtual machine according to the pre-migration virtual-machine identification information and a second correspondence, where the second correspondence includes a correspondence between the pre-migration virtual-machine identification information and the post-migration virtual-machine identification information.

With reference to the fourth aspect or any one of the foregoing possible implementation manners of the fourth aspect, in a third possible implementation manner of the fourth aspect, the determining, by the second backup server, the virtual machine according to the virtual-machine identification information includes: sending, by the second backup server, a query message to the migration management module and receiving an acknowledgment message from the migration management module, where the query message includes the pre-migration virtual-machine identification information, the migration management module is configured to manage a migration operation of the virtual machine and store the second correspondence, and the acknowledgment message includes the post-migration virtual-machine identification information.

With reference to the fourth aspect or any one of the foregoing possible implementation manners of the fourth aspect, in a fourth possible implementation manner of the fourth aspect, the backup information includes backup data information or a backup policy for the virtual machine, or a combination of the backup data information and the backup policy. If the first backup server and the second backup server share a storage device that is configured to store backup data of the virtual machine, the backup data information includes address information of the backup data of the virtual machine, in the storage device; or, if the first backup server and the second backup server do not share a storage device that is configured to store backup data of the virtual machine, the backup data information includes the backup data of the virtual machine.

With reference to the fourth aspect or any one of the foregoing possible implementation manners of the fourth aspect, in a fifth possible implementation manner of the fourth aspect, after the associating, by the second backup server, the virtual machine with the backup information, the method further includes: formulating, by the second backup server, a backup plan for the virtual machine according to the backup information. The backup plan may include a backup restoration plan. A data backup restoration plan with comprehensive consideration and thorough execution is the most important basic condition to ensure that restoration can succeed after occurrence of a data disaster.

With reference to the fourth aspect or any one of the foregoing possible implementation manners of the fourth aspect, in a sixth possible implementation manner of the fourth aspect, after the associating, by the second backup server, the virtual machine with the backup information, the method further includes: sending, by the second backup server, a feedback message to the first backup server, where the feedback message is used to indicate completion of migration of the backup information. After receiving the feedback message from the second backup server, the first backup server may tear down a communications connection to the second backup server, so as to release a communication resource.

According to a fifth aspect, this application provides a computer readable medium, including a computer executable instruction, where when a processor of a computer executes the computer executable instruction, the computer executes the method in the fourth aspect or any one of the possible implementation manners of the fourth aspect.

According to a sixth aspect, this application provides a computing device, including: a processor, a memory, a bus, and a communications interface, where the memory is configured to store an executable instruction, the processor and the memory are connected using the bus, and when the computing device runs, the processor executes the executable instruction stored by the memory to make the computing device execute the method in the fourth aspect or any one of the possible implementation manners of the fourth aspect.

According to a seventh aspect, this application provides an apparatus for migrating virtual machine backup information, where the apparatus includes: a receiving unit, configured to receive a migration trigger message, where the migration trigger message carries pre-migration virtual-machine identification information and indication information of a backup server, the apparatus is configured to back up data of a virtual machine running on a first computing device, and the backup server is configured to back up data of a virtual machine running on a second computing device; a determining unit, configured to determine backup information of a virtual machine according to the pre-migration virtual-machine identification information; and a sending unit, configured to send a backup information migration message to the backup server, where the backup information migration message carries the backup information and virtual-machine identification information.

With reference to the seventh aspect, in a first possible implementation manner of the seventh aspect, that the receiving unit is configured to receive a migration trigger message includes: the receiving unit is configured to receive a migration trigger message from the backup server, where the migration trigger message is used to request the apparatus to send the backup information of the virtual machine to the backup server.

With reference to the seventh aspect or the first possible implementation manner of the seventh aspect, in a second possible implementation manner of the seventh aspect, that the receiving unit is configured to receive a migration trigger message includes: the receiving unit is configured to receive a migration trigger message from a migration management module, where the migration management module is configured to manage a migration operation of the virtual machine, and the migration trigger message is used to indicate that a virtual machine is migrated from the first computing device to the second computing device.

With reference to the seventh aspect or any one of the foregoing possible implementation manners of the seventh aspect, in a third possible implementation manner of the seventh aspect, the indication information of the backup server is an identifier of the second computing device, and before the sending unit sends the backup information migration message to the backup server, the determining unit is further configured to determine the backup server according to the identifier of the second computing device and a first correspondence, where the first correspondence includes a correspondence between the second computing device and the backup server.

With reference to the seventh aspect or the first possible implementation manner of the seventh aspect, in a fourth possible implementation manner of the seventh aspect, that the receiving unit is configured to receive a migration trigger message includes: the receiving unit is configured to receive a migration trigger message from a backup server management platform, where the backup server management platform is configured to manage backup information migration between the apparatus and the backup server.

With reference to the seventh aspect or any one of the foregoing possible implementation manners of the seventh aspect, in a fifth possible implementation manner of the seventh aspect, the backup information includes backup data information or a backup policy for the virtual machine, or a combination of the backup data information and the backup policy. If the apparatus and the backup server share a storage device that is configured to store backup data of the virtual machine, the backup data information includes address information of the backup data of the virtual machine, in the storage device; or, if the apparatus and the backup server do not share a storage device that is configured to store backup data of the virtual machine, the backup data information includes the backup data of the virtual machine.

With reference to the seventh aspect or any one of the foregoing possible implementation manners of the seventh aspect, in a sixth possible implementation manner of the seventh aspect, after the sending unit sends the backup information migration message to the backup server, the receiving unit is further configured to receive a feedback message from the backup server, where the feedback message is used to indicate completion of migration of the backup information.

The seventh aspect is an apparatus implementation manner of the first backup server in the first aspect or any one of the possible implementation manners of the first aspect; feature description in the first aspect or any one of the possible implementation manners of the first aspect is applicable to the seventh aspect or any one of the possible implementation manners of the seventh aspect, and details are not described herein again.

According to an eighth aspect, this application provides an apparatus for migrating virtual machine backup information, where the apparatus includes: a receiving unit, configured to receive a backup information migration message from a backup server, where the backup information migration message includes virtual-machine identification information and backup information of a virtual machine, the backup server is configured to back up data of a virtual machine running on a first computing device, and the apparatus is configured to back up data of a virtual machine running on a second computing device; a determining unit, configured to determine the virtual machine according to the virtual-machine identification information; and a processing unit, configured to associate the virtual machine with the backup information.

With reference to the eighth aspect, in a first possible implementation manner of the eighth aspect, before receiving the backup information migration message from the backup server, the receiving unit is further configured to receive a notification message from a migration management module, where the notification message carries indication information of the backup server and pre-migration virtual-machine identification information, and the migration management module is configured to manage a migration operation of the virtual machine; and the apparatus further includes a sending unit, configured to send a migration trigger message to the backup server, where the migration trigger message is used to request the backup server to send the backup information of the virtual machine to the apparatus, and the migration trigger message carries the pre-migration virtual-machine identification information and indication information of the apparatus.

With reference to the eighth aspect or the first possible implementation manner of the eighth aspect, in a second possible implementation manner of the eighth aspect, the virtual-machine identification information is the pre-migration virtual-machine identification information; and that the determining unit is configured to determine the virtual machine according to the virtual-machine identification information includes: the determining unit is configured to determine post-migration virtual-machine identification information of the virtual machine according to the pre-migration virtual-machine identification information and a second correspondence, where the second correspondence includes a correspondence between the pre-migration virtual-machine identification information and the post-migration virtual-machine identification information.

With reference to the eighth aspect or any one of the foregoing possible implementation manners of the eighth aspect, in a third possible implementation manner of the eighth aspect, the apparatus further includes a sending unit, and that the determining unit is configured to determine the virtual machine according to the virtual-machine identification information includes: the determining unit is configured to send a query message to the migration management module using the sending unit, where the query message includes the pre-migration virtual-machine identification information, and the migration management module is configured to manage a migration operation of the virtual machine and store the second correspondence; and the determining unit is configured to receive an acknowledgment message from the migration management module using the receiving unit, where the acknowledgment message includes the post-migration virtual-machine identification information.

With reference to the eighth aspect or any one of the foregoing possible implementation manners of the eighth aspect, in a fourth possible implementation manner of the eighth aspect, the backup information includes backup data information or a backup policy for the virtual machine, or a combination of the backup data information and the backup policy. If the backup server and the apparatus share a storage device that is configured to store backup data of the virtual machine, the backup data information includes address information of the backup data of the virtual machine, in the storage device; or, if the backup server and the apparatus do not share a storage device that is configured to store backup data of the virtual machine, the backup data information includes the backup data of the virtual machine.

With reference to the eighth aspect or any one of the foregoing possible implementation manners of the eighth aspect, in a fifth possible implementation manner of the eighth aspect, after associating the virtual machine with the backup information, the processing unit is further configured to formulate a backup plan for the virtual machine according to the backup information.

With reference to the eighth aspect or any one of the foregoing possible implementation manners of the eighth aspect, in a sixth possible implementation manner of the eighth aspect, after the processing unit associates the virtual machine with the backup information, the sending unit is further configured to send a feedback message to the backup server, where the feedback message is used to indicate completion of migration of the backup information.

The eighth aspect is an apparatus implementation manner of the second backup server in the fourth aspect or any one of the possible implementation manners of the fourth aspect; feature description in the fourth aspect or any one of the possible implementation manners of the fourth aspect is applicable to the eighth aspect or any one of the possible implementation manners of the eighth aspect, and details are not described herein again.

According to a ninth aspect, this application provides a system for migrating a virtual machine backup information, where the system includes a first backup server and a second backup server, where the first backup server is configured to: receive a migration trigger message, where the migration trigger message carries pre-migration virtual-machine identification information and indication information of the second backup server, determine backup information of a virtual machine according to the pre-migration virtual-machine identification information, and send a backup information migration message to the second backup server, where the backup information migration message carries the backup information and virtual-machine identification information; and the second backup server is configured to: receive the backup information migration message from the first backup server, determine the virtual machine according to the virtual-machine identification information, and associate the virtual machine with the backup information.

With reference to the ninth aspect, in a first possible implementation manner of the ninth aspect, the system further includes a migration management module, where the migration management module is configured to manage a migration operation of the virtual machine; the first backup server is specifically configured to receive a migration trigger message from the second backup server; and before sending the migration trigger message to the first backup server, the second backup server is further configured to receive a notification message from the migration management module, where the notification message carries indication information of the first backup server and the pre-migration virtual-machine identification information, and the migration management module is configured to manage a migration operation of the virtual machine.

With reference to the ninth aspect or any one of the foregoing possible implementation manner of the ninth aspect, in a second possible implementation manner of the ninth aspect, the system further includes a migration management module, where the migration management module is configured to manage a migration operation of the virtual machine; and the first backup server is specifically configured to receive a migration trigger message from the migration management module.

With reference to the ninth aspect or any one of the foregoing possible implementation manners of the ninth aspect, in a third possible implementation manner of the ninth aspect, the indication information of the second backup server is an identifier of a second computing device; and before sending the backup information migration message to the second backup server, the first backup server is further configured to determine the second backup server according to the identifier of the second computing device and a first correspondence, where the first correspondence includes a correspondence between the second computing device and the second backup server.

With reference to the ninth aspect or any one of the foregoing possible implementation manners of the ninth aspect, in a fourth possible implementation manner of the ninth aspect, the system further includes a backup server management platform and a migration management module, where the backup server management platform is configured to manage a backup information migration operation between the first backup server and the second backup server, and the migration management module is configured to manage a migration operation of the virtual machine; the first backup server is specifically configured to receive a migration trigger message from the backup server management platform; and before sending the migration trigger message to the first backup server, the backup server management platform is further configured to receive a notification message from the migration management module, where the notification message carries indication information of the first backup server, the indication information of the second backup server, and the pre-migration virtual-machine identification information.

With reference to the ninth aspect or any one of the foregoing possible implementation manners of the ninth aspect, in a fifth possible implementation manner of the ninth aspect, the virtual-machine identification information is the pre-migration virtual-machine identification information; and the second backup server is specifically configured to determine post-migration virtual-machine identification information of the virtual machine according to the pre-migration virtual-machine identification information and a second correspondence, where the second correspondence includes a correspondence between the pre-migration virtual-machine identification information and the post-migration virtual-machine identification information.

With reference to the ninth aspect or any one of the foregoing possible implementation manners of the ninth aspect, in a sixth possible implementation manner of the ninth aspect, the system further includes a migration management module, and the migration management module is configured to manage a migration operation of the virtual machine and store the second correspondence; the second backup server is specifically configured to send a query message to the migration management module, where the query message includes the pre-migration virtual-machine identification information; and the second backup server is configured to receive an acknowledgment message from the migration management module, where the acknowledgment message includes the post-migration virtual-machine identification information.

With reference to the ninth aspect or any one of the foregoing possible implementation manners of the ninth aspect, in a seventh possible implementation manner of the ninth aspect, the backup information includes backup data information or a backup policy for the virtual machine, or a combination of the backup data information and the backup policy. If the first backup server and the second backup server share a storage device that is configured to store backup data of the virtual machine, the backup data information includes address information of the backup data of the virtual machine, in the storage device; or, if the first backup server and the second backup server do not share a storage device that is configured to store backup data of the virtual machine, the backup data information includes the backup data of the virtual machine.

With reference to the ninth aspect or any one of the foregoing possible implementation manners of the ninth aspect, in an eighth possible implementation manner of the ninth aspect, after associating the virtual machine with the backup information, the second backup server is further configured to formulate a backup plan for the virtual machine according to the backup information.

With reference to the ninth aspect or any one of the foregoing possible implementation manners of the ninth aspect, in a ninth possible implementation manner of the ninth aspect, after associating the virtual machine with the backup information, the second backup server is further configured to send a feedback message to the first backup server, where the feedback message is used to indicate completion of migration of the backup information.

The ninth aspect is a system implementation manner corresponding to the first aspect and the fourth aspect, the feature description in the first aspect or any one of the possible implementation manners of the first aspect, or in the fourth aspect or any one of the possible implementation manners of the fourth aspect is applicable to the ninth aspect or any one of the possible implementation manners of the ninth aspect, and details are not described herein again.

According to a tenth aspect, this application provides a method for migrating virtual machine backup information, where the method includes: migrating, by a migration management module, a virtual machine running on a first computing device to a second computing device; and sending, by the migration management module, a migration trigger message to a first backup server, where the migration trigger message carries pre-migration virtual-machine identification information and indication information of a second backup server.

If the first computing device and the second computing device belong to a same data center, after migrating the virtual machine from the first computing device to the second computing device, a migration management module of the data center sends a migration trigger message to the first backup server, where the migration trigger message is used to instruct the first backup server to migrate backup information of the virtual machine to the second backup server. If the first computing device and the second computing device respectively belong to two different data centers: a first data center and a second data center, a migration management module of the first data center or the second data center may send a migration trigger message to the first backup server.

According to an eleventh aspect, this application provides a computer readable medium, including a computer executable instruction, where when a processor of a computer executes the computer executable instruction, the computer executes the method in the tenth aspect.

According to a twelfth aspect, this application provides a computing device, including: a processor, a memory, a bus, and a communications interface, where the memory is configured to store an executable instruction, the processor and the memory are connected using the bus, and when the computing device runs, the processor executes the executable instruction stored by the memory to make the computing device execute the method in the tenth aspect.

According to a thirteenth aspect, this application provides an apparatus for migrating virtual machine backup information, where the apparatus includes: a migration unit, configured to migrate a virtual machine running on a first computing device to a second computing device; and a sending unit, configured to send a migration trigger message to a first backup server, where the migration trigger message carries pre-migration virtual-machine identification information and indication information of a second backup server. The thirteenth aspect is an apparatus implementation manner of the migration management module of the tenth aspect, the feature description in the tenth aspect is applicable to the thirteenth aspect, and details are not described herein again.

According to a fourteenth aspect, this application provides a method for migrating virtual machine backup information, and the method includes: receiving, by a backup server management platform, a migration notification message from a migration management module, where the migration notification message carries an identifier of a first computing device, an identifier of a second computing device, and pre-migration virtual-machine identification information, and the migration notification message is used to indicate that a virtual machine is migrated from the first computing device to the second computing device; and determining, by the backup server management platform, a first backup server according to the identifier of the first computing device, determining a second backup server according to the identifier of the second computing device, and sending a migration trigger message to the first backup server, where the migration trigger message carries the pre-migration virtual-machine identification information and indication information of the second backup server. The backup server management platform is responsible for centralized management and scheduling of the first backup server and the second backup server, monitors a virtual-machine migration event, and schedules virtual-machine backup information migration. The backup server management platform stores a correspondence between a computing device and a backup server.

According to a fifteenth aspect, this application provides a computer readable medium, including a computer executable instruction, where when a processor of a computer executes the computer executable instruction, the computer executes the method in the fourteenth aspect.

According to a sixteenth aspect, this application provides a computing device, including: a processor, a memory, a bus, and a communications interface, where the memory is configured to store an executable instruction, the processor and the memory are connected using the bus, and when the computing device runs, the processor executes the executable instruction stored by the memory to make the computing device execute the method in the fourteenth aspect.

According to a seventeenth aspect, this application provides an apparatus for migrating virtual machine backup information, where the apparatus includes: a receiving unit, configured to receive a migration notification message from a migration management module, where the migration notification message carries an identifier of a first computing device, an identifier of a second computing device, and pre-migration virtual-machine identification information, and the migration notification message is used to indicate that a virtual machine is migrated from the first computing device to the second computing device; a determining unit, configured to determine a first backup server according to the identifier of the first computing device and determine a second backup server according to the identifier of the second computing device; and a sending unit, configured to send a migration trigger message to the first backup server, where the migration trigger message carries the pre-migration virtual-machine identification information and indication information of the second backup server. The seventeenth aspect is an apparatus implementation manner of the migration management module of the fourteenth aspect, the feature description in the fourteenth aspect is applicable to the seventeenth aspect, and details are not described herein again.

According to an eighteenth aspect, this application provides a method for migrating virtual machine backup information, where the method includes: sending, by a first migration management module, a migration notification message to a first backup server, where the migration notification message carries pre-migration virtual-machine identification information of a virtual machine; determining, by the first backup server, backup information of the virtual machine according to the migration notification message, and creating a backup data volume, where the backup data volume includes the backup information and virtual-machine identification information that are of the virtual machine; sending, by the first backup server, indication information of the backup data volume to the first migration management module; determining, by the first migration management module, the backup data volume according to the indication information of the backup data volume; sending, by the first migration management module, a backup information migration message to a second migration management module, where the backup information migration message carries indication information of a second backup server and the backup data volume; mounting, by the second migration management module, the backup data volume to the second backup server according to the backup information migration message; and determining, by the second backup server, the virtual machine according to the virtual-machine identification information, and associating the virtual machine with the backup information of the virtual machine.

According to a nineteenth aspect, this application provides a method for migrating virtual machine backup information, and the method includes: sending, by a first migration management module, a migration notification message to a first backup server, where the migration notification message carries pre-migration virtual-machine identification information of a virtual machine; determining, by the first backup server, backup information of the virtual machine according to the migration notification message, and creating a backup data volume, where the backup data volume includes the backup information and virtual-machine identification information that are of the virtual machine; sending, by the first backup server, indication information of the backup data volume to the first migration management module; determining, by the first migration management module, the backup data volume according to the indication information of the backup data volume; sending, by the first migration management module, a backup information migration message to a second migration management module, where the backup information migration message carries the backup data volume; determining, by the second migration management module, a second backup server according to the virtual-machine identification information, and mounting the backup data volume to the second backup server; and determining, by the second backup server, the virtual machine according to the virtual-machine identification information, and associating the virtual machine with the backup information of the virtual machine.

According to the technical solutions disclosed in this application, when a virtual machine is migrated from a first computing device to a second computing device, where the first computing device and the second computing device have different backup servers, because computing devices that have different backup servers cannot share backup information, by means of backup data information migration and backup policy migration, after being migrated to a new location, backup data of the virtual machine before the migration can be inherited, such that the migrated virtual machine continues to be protected by the backup data existing before the migration. If an error occurs, the original backup data may be used for restoration, and a risk of losing user data is reduced. In addition, by means of backup policy migration, a backup server of the second computing device can back up data of the virtual machine according to a backup policy existing before the migration, such that data can be backed up continuously.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1A:
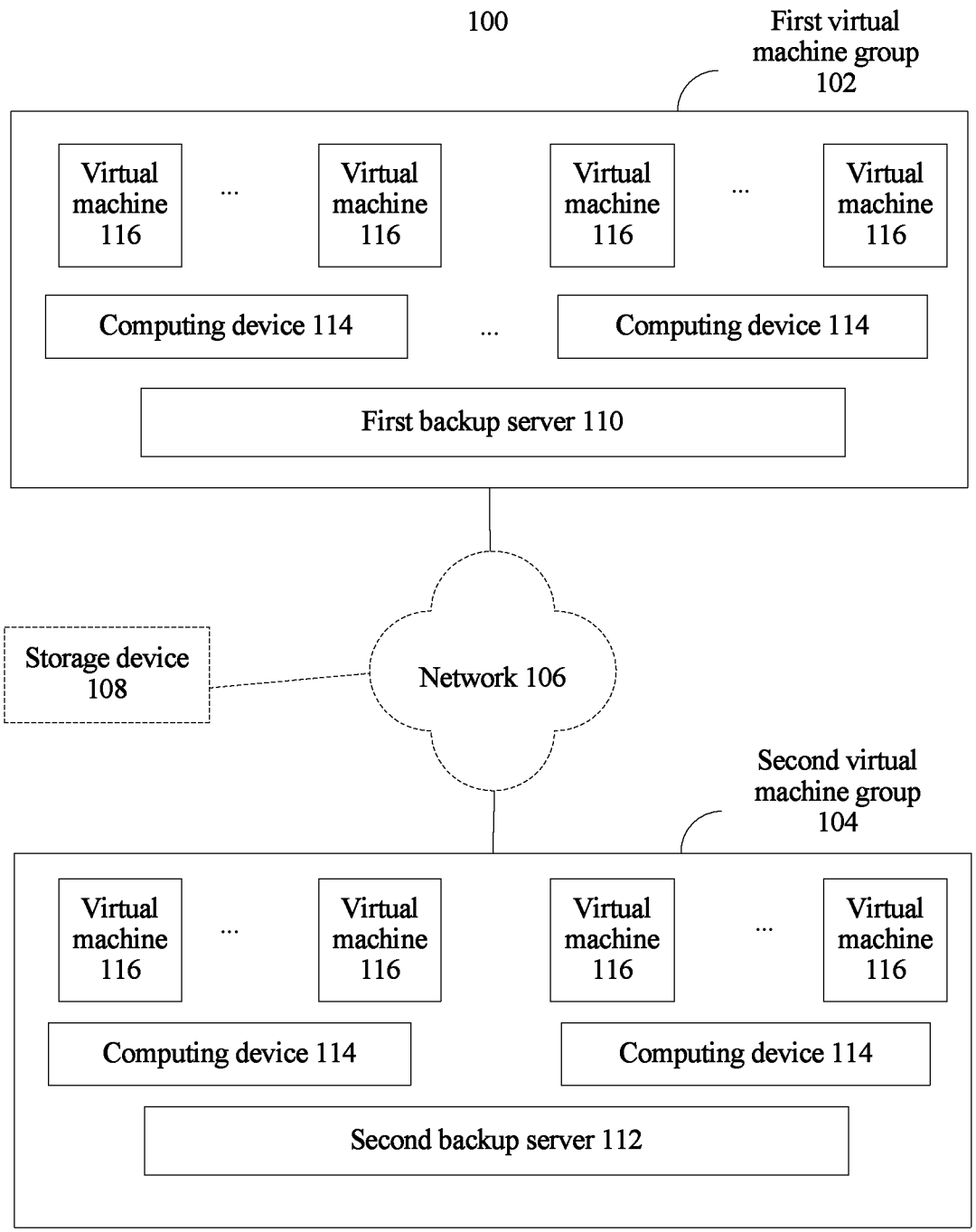
FIG. 1(a), FIG. 1(b), FIG. 1(c), FIG. 1(d), and FIG. 1(e) are exemplary block diagrams of a system for migrating virtual machine backup information according to an embodiment of the present disclosure.

The following describes embodiments of the present disclosure with reference to accompanying drawings.

According to the embodiments of the present disclosure, a backup server is configured to manage a data backup of a virtual machine in a virtual machine group, one virtual machine group may include multiple computing devices, and there may be multiple virtual machines running on each computing device. A virtual machine may be migrated between different computing devices. Virtual-machine migration can simplify system maintenance and management, improve system load balancing, enhance system error tolerance, optimize system power management, and so on. For the purpose of enhancing system redundancy performance, a backup server is configured to back up data of a virtual machine inside a data center. When an error occurs on the virtual machine, backup data of the virtual machine may be used to perform operations such as virtual-machine restoration.

When a virtual machine is migrated inside a virtual machine group, because different computing devices inside a virtual machine group have a common backup server, a migration operation does not need to be performed on backup data. When a virtual machine is migrated between different virtual machine groups, because different virtual machine groups have different backup servers, and virtual-machine backups of different virtual machine groups are independent of each other, to ensure that a migrated virtual machine continues to be protected by backup data, backup information needs to be migrated.

The backup information includes backup data information and/or a backup policy. If two virtual machine groups, in which the virtual machine is located before and after migration, share a storage device that is configured to store backup data, the backup data information may be address information of backup data of the virtual machine, in the storage device; or, if two virtual machine groups, in which a virtual machine is located before and after migration, do not share a storage device that is configured to store backup data, the backup data information is backup data of the virtual machine.

The backup policy refers to a backup-requiring object, backup time, and a backup manner. Migrating the backup policy is backing up data of a migrated virtual machine still according to an original backup policy. There are various backup manners, and a backup policy determines a data backup method to be used. For example, a backup manner may be one or a combination of full backup, incremental backup, or differential backup.

In this application, specific implementation of a backup policy is not limited, and any backup manner may be used. In actual application, a backup manner may be a combination of multiple manners. For example, an incremental backup or a differential backup is performed once every day from Monday to Saturday; a full backup is performed every Sunday; a full backup is performed at the end of every month; and a full backup is performed at the end of every year.

Different types of data are different in significance, and backup manners may also be different. For example, for data of general significance, only a full backup needs to be re-established after a period of time; and for data of great significance, a full backup needs to be established after a period of time, multiple differential backups need to be performed within this period of time, and an incremental backup needs to be established every day or every hour. Migrating a backup policy may enable data of a migrated virtual machine to be backed up according to a backup policy determined before migration, and a resource of a backup server may be used more properly.

The backup policy may further include specific content of backup-requiring data. Backup content includes a current location change, a content change, a hard link, an instruction, and the like that are of the data, and should occasionally include a permission, an owner, an encryption state, and the like that are of a backup file.

The backup policy may further include execution time of each backup manner. Because simultaneous execution of multiple backups consumes much network bandwidth and a large quantity of computer resources, such backup methods as full backup and incremental backup need to be staggered, for example, the full backup may be arranged to be executed in idle time, and a corresponding incremental backup or differential backup is executed without affecting a normal service.

It should be understood that, the foregoing description is only a general exemplary description of a function of the backup policy, and there may be various backup policies according to different functions of a virtual machine. Different backup policies may include more or less content, and this application imposes no limitation thereto.

FIG. 1(a) shows a block diagram of an exemplary networking environment of a system 100 for migrating virtual machine backup information. As shown in FIG. 1(a), the system 100 includes a first virtual machine group 102 and a second virtual machine group 104, and may further include a storage device 108. Both the first virtual machine group 102 and the second virtual machine group 104 include at least one computing device 114, and at least one virtual machine 116 runs on each computing device 114. A first backup server 110 is configured to manage a data backup of a virtual machine 114 in the first virtual machine group 102, and a second backup server 112 is configured to manage a data backup of a virtual machine 114 in the second virtual machine group 104.

A component in the first virtual machine group 102 and a component in the second virtual machine group 104 may communicate using a network 106.

The network 106 may be the Internet, an intranet, a Local Area Network (LAN), a Wide Area Network (WAN), a Storage Area Network (SAN), and the like, or a combination of the foregoing networks.

The storage device 108 may be coupled to a component inside the first virtual machine group 102 and/or a component inside the second virtual machine group 104 using a communications interface, or may be coupled to a component inside the first virtual machine group 102 and/or a component inside the second virtual machine group 104 using the network 106. Components of both or either of the first virtual machine group 102 and the second virtual machine group 104 may access the storage device 108. Optionally, the storage device 108 may be configured to store backup data of a virtual machine 116 in the first virtual machine group 102 and/or the second virtual machine group 104.

In actual service deployment, the first virtual machine group 102 and the second virtual machine group 104 may be deployed in a same data center, or may be deployed in different data centers.

Figure 1B:
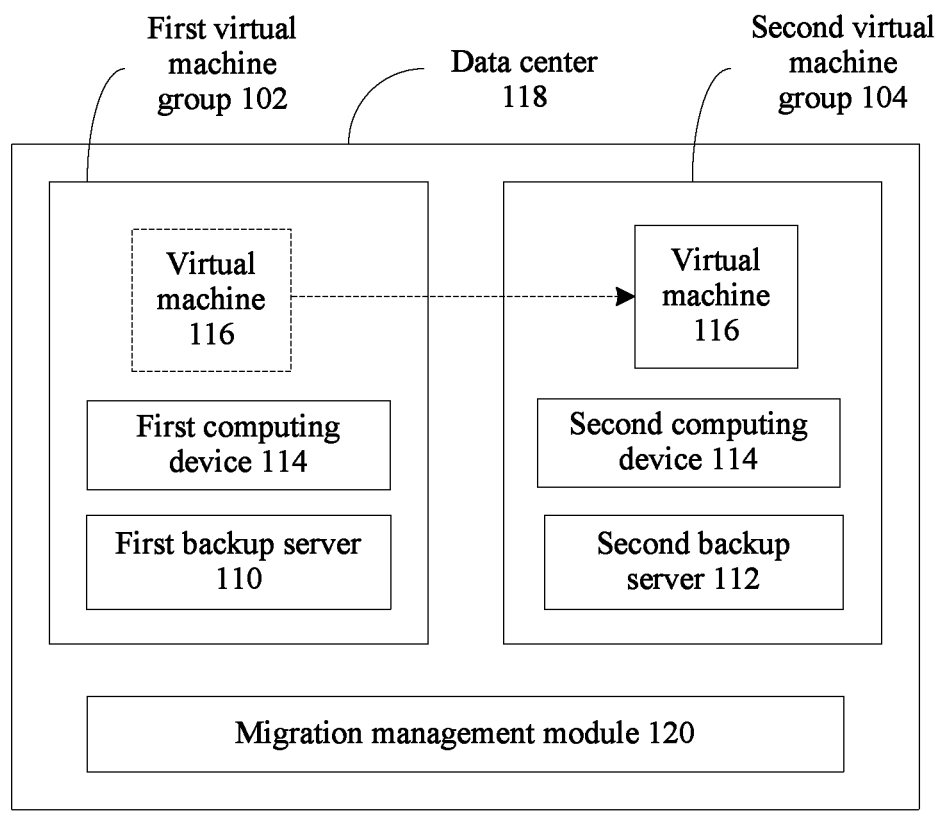

As shown in FIG. 1(b), FIG. 1(b) is a specific implementation manner of FIG. 1(a). The first virtual machine group 102 and the second virtual machine group 104 are deployed in a same data center 118, and have a same migration management module 120. The migration management module 120 is configured to manage a migration operation on a virtual machine in the data center 118.

Figure 1C:
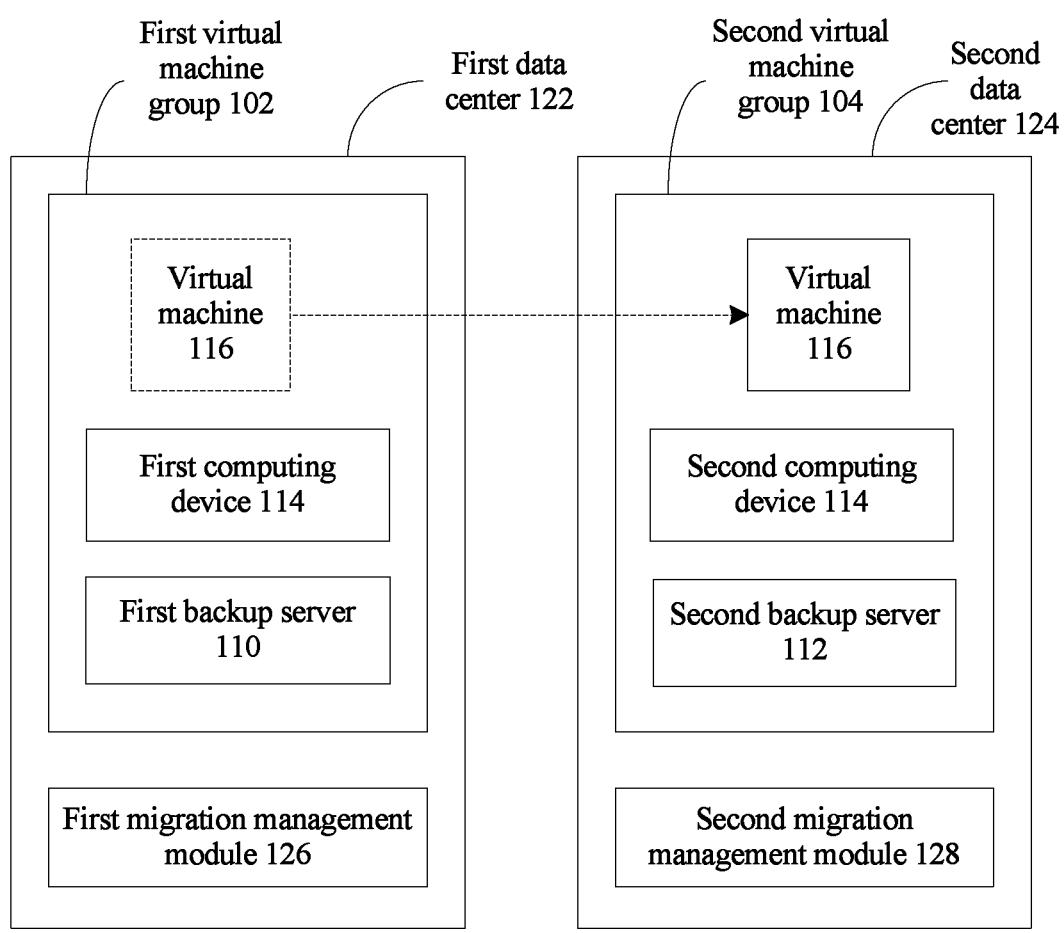

As shown in FIG. 1(c), FIG. 1(c) is another specific implementation manner of FIG. 1(a). The first virtual machine group 102 and the second virtual machine group 104 are respectively deployed in two different data centers: a first data center 122 and a second data center 124. The first data center 122 has a migration management module 126, and the second data center has a second migration management module 128.

A migration management module is configured to manage migration of a virtual machine 116 inside a data center in which the migration management module is located, and manage an operation performed, on the virtual machine, inside the data center or cross data centers.

In specific implementation, a migration management module and a backup server may be independent components, or may be components integrated on a cloud management platform of a data center, that is, functions or a part of functions of the migration management module and/or the backup server may be integrated on the cloud management platform of the data center. The migration management module and the backup server may be implemented using software or hardware, and this embodiment of the present disclosure imposes no limitation on an implementation manner of the migration management module and the backup server. If all functions of the migration management module and the backup server are integrated on the cloud management platform, a communication process that is between the migration management module and the backup server and in the following description may be simplified.

Figure 1D:
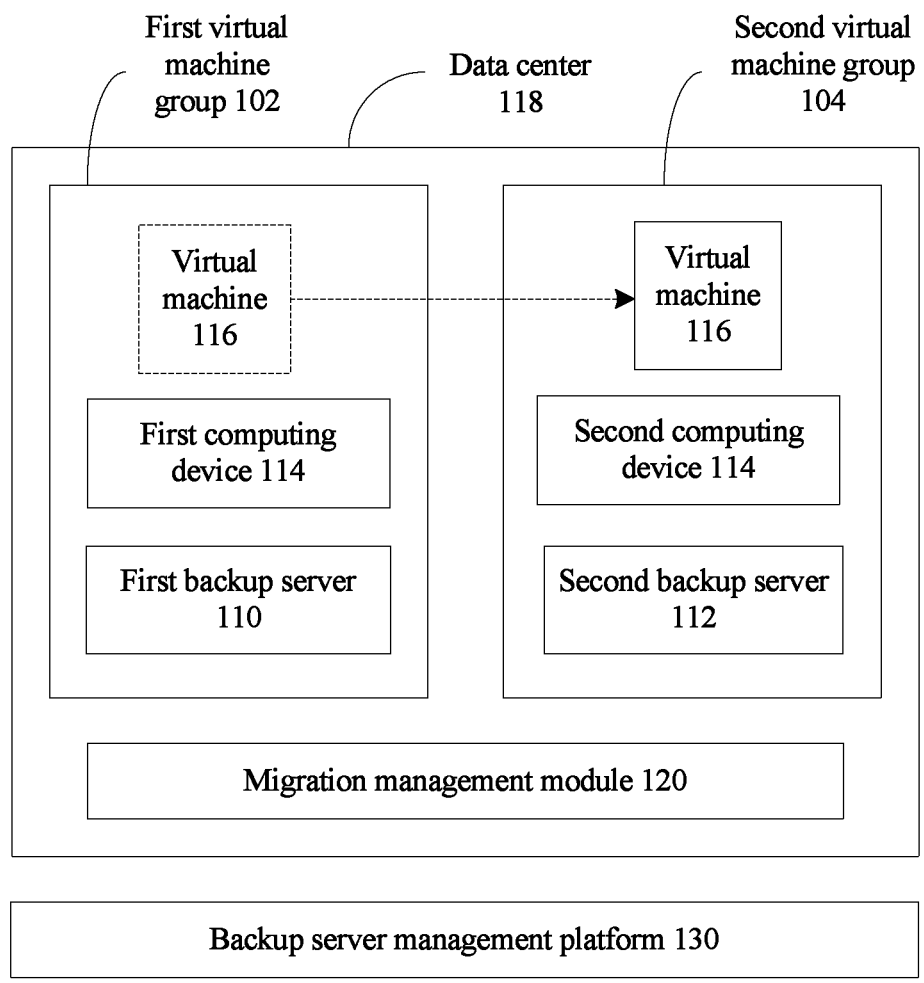
Figure 1E:
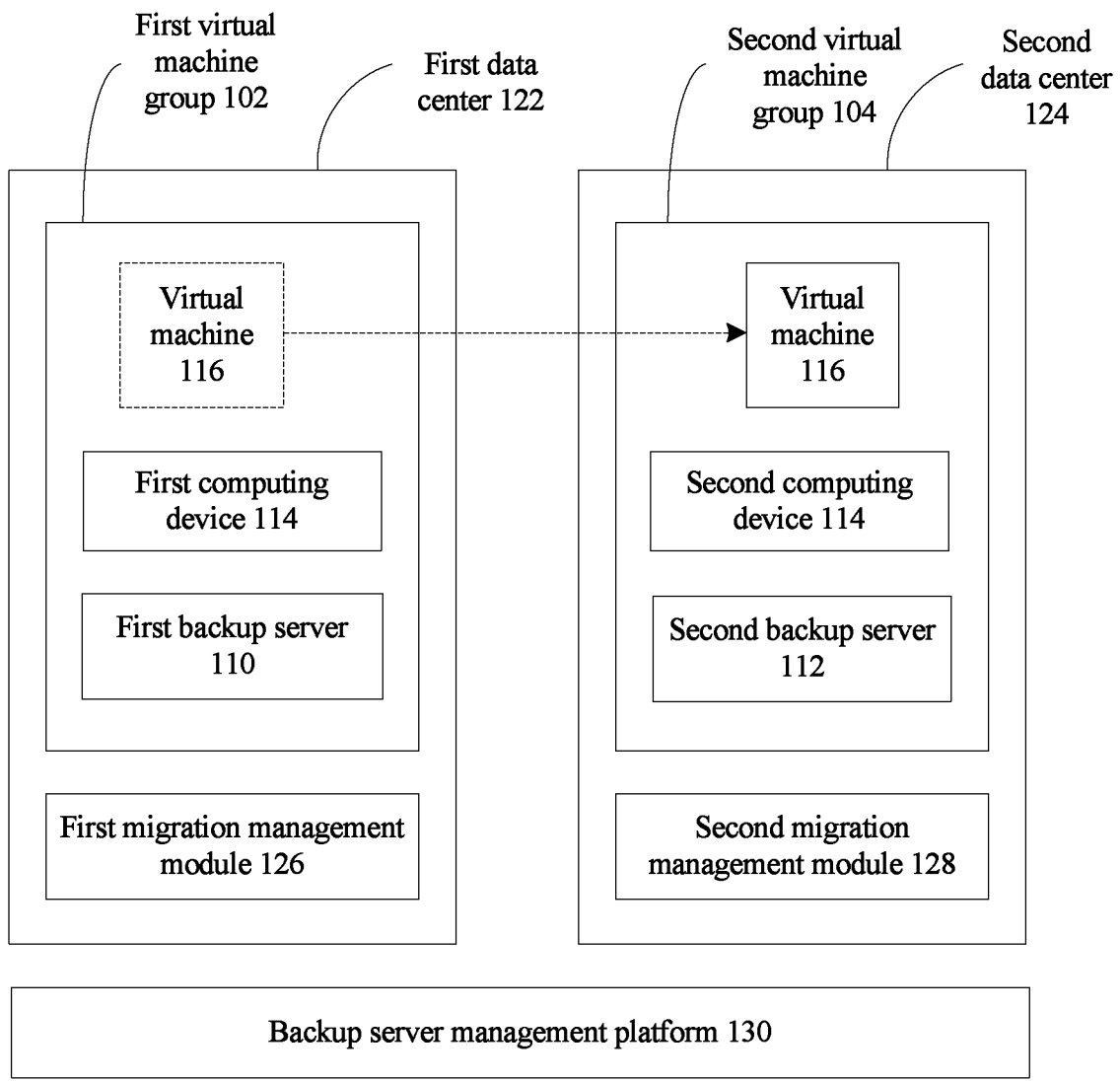

The system 100 may further include a backup server management platform. As shown in FIG. 1(d) and FIG. 1(e), the backup server management platform is responsible for centralized management and scheduling of the first backup server 110 and the second backup server 112, monitors a virtual-machine migration event, and schedules virtual-machine backup information migration. The backup server management platform stores a correspondence between a computing device and a backup server.

It should be understood that the foregoing naming is merely for ease of description and imposes no limitation on the present disclosure.

It should be understood that an objective of FIG. 1(a) to FIG. 1(e) is merely to exemplarily introduce participants of the system 100 for migrating virtual machine backup information and mutual relationships between the participants. Therefore, the described system 100 is highly simplified. This embodiment of the present disclosure only gives a general description of the system 100, and imposes no limitation on an implementation manner of the system 100. In addition, the computing device 114, the first backup server 110, and the second backup server 112 in FIG. 1(a) to FIG. 1(e) may have any architecture, and this embodiment of the present disclosure imposes no limitation thereto.

Figure 2:
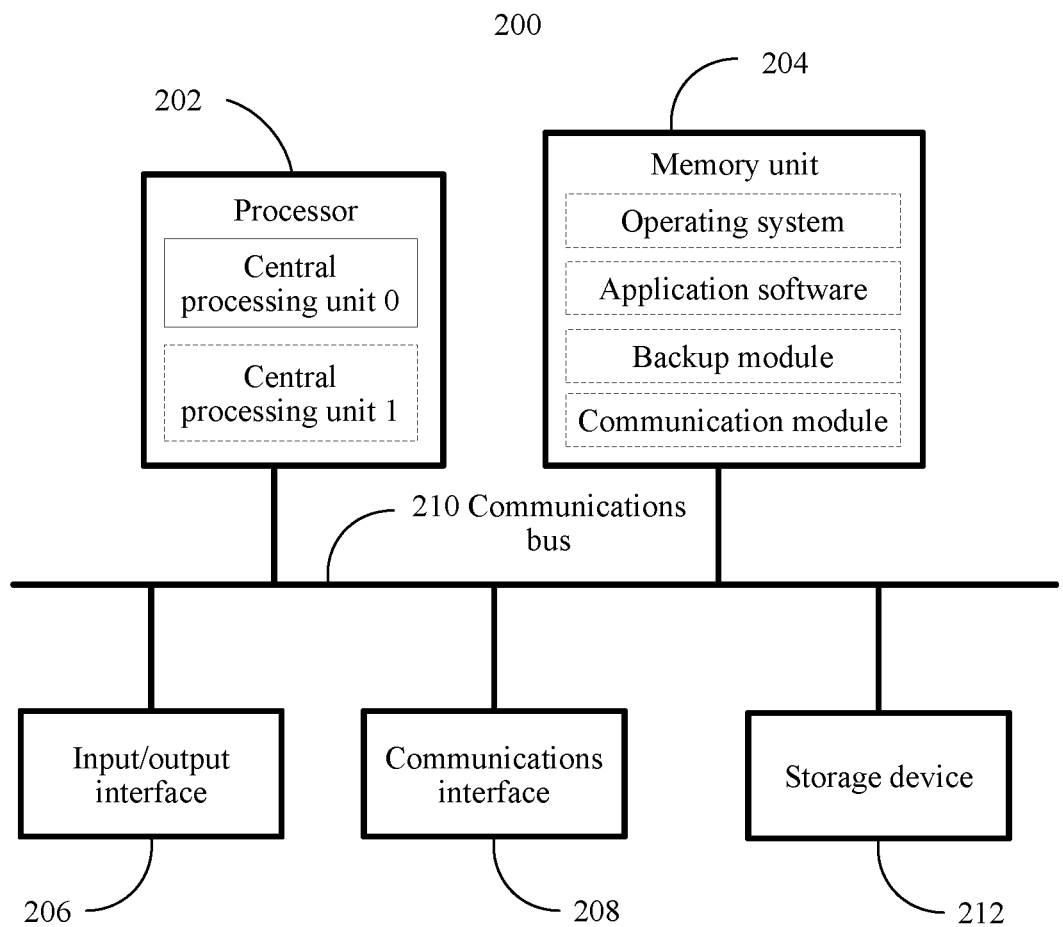
FIG. 2 is a schematic diagram of a hardware structure of a computing device according to an embodiment of the present disclosure.

The first backup server 110, the second backup server 112, the migration management module 120, the first migration management module 126, the second migration management module 128, and the backup server management platform 130 shown in FIG. 1(a) to FIG. 1(e) may be implemented using a computer 200 shown in FIG. 2.

FIG. 2 is a schematic diagram of a simplified logical structure of the computer 200. As shown in FIG. 2, the computer 200 includes a processor 202, a memory unit 204, an input/output interface 206, a communications interface 208, a bus 210, and a storage device 212. The processor 202, the memory unit 204, the input/output interface 206, the communications interface 208, and the storage device 212 implement communications connections with each other using the bus 210.

The processor 202 is a control center of the computer 200 and is configured to execute a related program, so as to implement a technical solution provided in this embodiment of the present disclosure. Optionally, the processor 202 includes one or more Central Processing Units (CPU), for example, a central processing unit 0 and a central processing unit 1 shown in FIG. 2. Optionally, the computer 200 may further include multiple processors 202, and each of the processors 202 may be a single-core processor (including one CPU) or a multi-core processor (including multiple CPUs). Unless otherwise noted, in the present disclosure, a component that is configured to execute a specific function, for example, a processor or a memory unit, may be implemented by configuring a universal component to execute a corresponding function, or may be implemented using a dedicated component that specially executes a specific function, and this application imposes no limitation thereto. The processor 202 may be a general central processing unit, a microprocessor, an Application-Specific Integrated Circuit (ASIC), or one or more integrated circuits, and is configured to execute a related program, so as to implement the technical solution provided in this application.

The processor 202 may be connected to one or more storage solutions using the bus 210. The storage solution may include the memory unit 204 and the storage device 212. The storage device 212 may be a Read Only Memory (ROM), a static storage device, a dynamic storage device, or a Random Access Memory (RAM). The memory unit 204 may be a random access memory. The memory unit 204 may be integrated with the processor 202 or integrated inside the processor 202, or may be one or more storage units that are independent of the processor 202.

Program code to be executed by the processor 202 or a CPU inside the processor 202 may be stored in the storage device 212 or the memory unit 204. Optionally, program code stored in the storage device 212 (such as an operating system, application software, a backup module, or a communication module) is copied into the memory unit 204, for execution by the processor 202.

The storage device 212 may be a physical hard disk or a partition (including a small computer system interface memory or a global network block device volume) of the physical hard disk, a network storage protocol (including a network or cluster file system such as a Network File System), a virtual storage device based on a file (virtual disk mirroring), or a storage device based on a logical volume. The storage device 212 may include a high-speed RAM, and may also include a nonvolatile memory, for example, one or more disk memories, flash memories, or other nonvolatile memories. In some embodiments, the storage device may further include a remote memory that is separate from the one or more processors 202, for example, a network disk that accesses a communications network using the communications interface 208, where the communications network may be the Internet, an intranet, a LAN, a WAN, a SAN, and the like, or a combination of the foregoing networks. The storage device 212 may further be configured to store backup data of a virtual machine 116, backed up by a backup module.

An operating system (such as Darwin, RTXC, LINUX, UNIX, OS X, WINDOWS, or an embedded operating system such as Vxworks) includes various software components and/or drivers that are configured to control and manage routine system tasks (such as memory management, storage device control, and power management) and facilitate communication between various software components and hardware components.

The input/output interface 206 is configured to receive inputted data and information, and output data such as an operation result.

The communications interface 208 uses a transceiver like transceiving apparatus without being limited thereto, to implement communication between the computer 200 and another device or a communications network.

The bus 210 may include a path to transmit information between all components (such as the processor 202, the memory unit 204, the input/output interface 206, the communications interface 208, and the storage device 212) of the computer 200. Optionally, the bus 210 may use a wired connection manner or use a wireless communication manner, and this application imposes no limitation thereto.

It should be noted that for the computer 200, although only the processor 202, the memory unit 204, the input/output interface 206, the communications interface 208, the bus 210, and the storage device 212 are shown in FIG. 2, in a specific implementation process, persons skilled in the art should understand that the computer 200 also includes another component required for implementing normal operating.

The computer 200 may be a common general-purpose computer or a computing device of a special use, and includes but is not limited to any electronic device such as a portable computer, a personal desktop computer, a network server, a tablet, a mobile phone, a Personal Digital Assistant (PDA), or a device combined by two or more of the foregoing devices, and this application imposes no limitation on a specific implementation form of the computer 200.

In addition, the computer 200 in FIG. 2 is only an example of the computer 200, where the computer 200 may include more or fewer components in comparison with that shown in FIG. 2, or have a component configuration manner that is different from that shown in FIG. 2. Persons skilled in the art should understand that, according to a specific need, the computer 200 may further include a hardware component that implements another additional function. Persons skilled in the art should understand that the computer 200 may include only a component that is required for implementing an embodiment of the present disclosure, instead of all components shown in FIG. 2. In addition, the various components shown in FIG. 2 may be implemented by means of hardware, software, or a combination of hardware and software.

The hardware structure shown in FIG. 2 and the foregoing description are applicable to various computing devices that are provided in the embodiments of the present disclosure, and are applicable to executing various methods for migrating virtual machine backup information that are provided in embodiments of the present disclosure.

As shown in FIG. 2, the memory unit 204 of the computer 200 includes a backup module. The processor 202 executes program code of the backup module, so as to implement migration of backup information of a virtual machine.

Because virtual machines of different virtual machine groups cannot share backup information, when a virtual machine 116 is migrated from a first virtual machine group 102 to a second virtual machine group 104, if backup data information and a backup policy are not migrated, after the virtual machine is migrated to a new location, in the second virtual machine group 104, backup data of the virtual machine before the migration cannot be inherited after the migration. Therefore, if an error occurs after the virtual machine is migrated, the original backup data cannot be used for restoration, which not only causes loss of a value of the backup, but also increases a risk of losing user data. In addition, a second backup server 112 cannot execute a same backup policy as before the migration, on the virtual machine, and a relatively high cost is required to designate another proper backup policy for the migrated virtual machine.

The backup module may be formed by one or more operation instructions, to make the computer 200 execute one or more method steps according to the foregoing description. A specific method step is described in detail in the following parts of this application.

Figure 3:
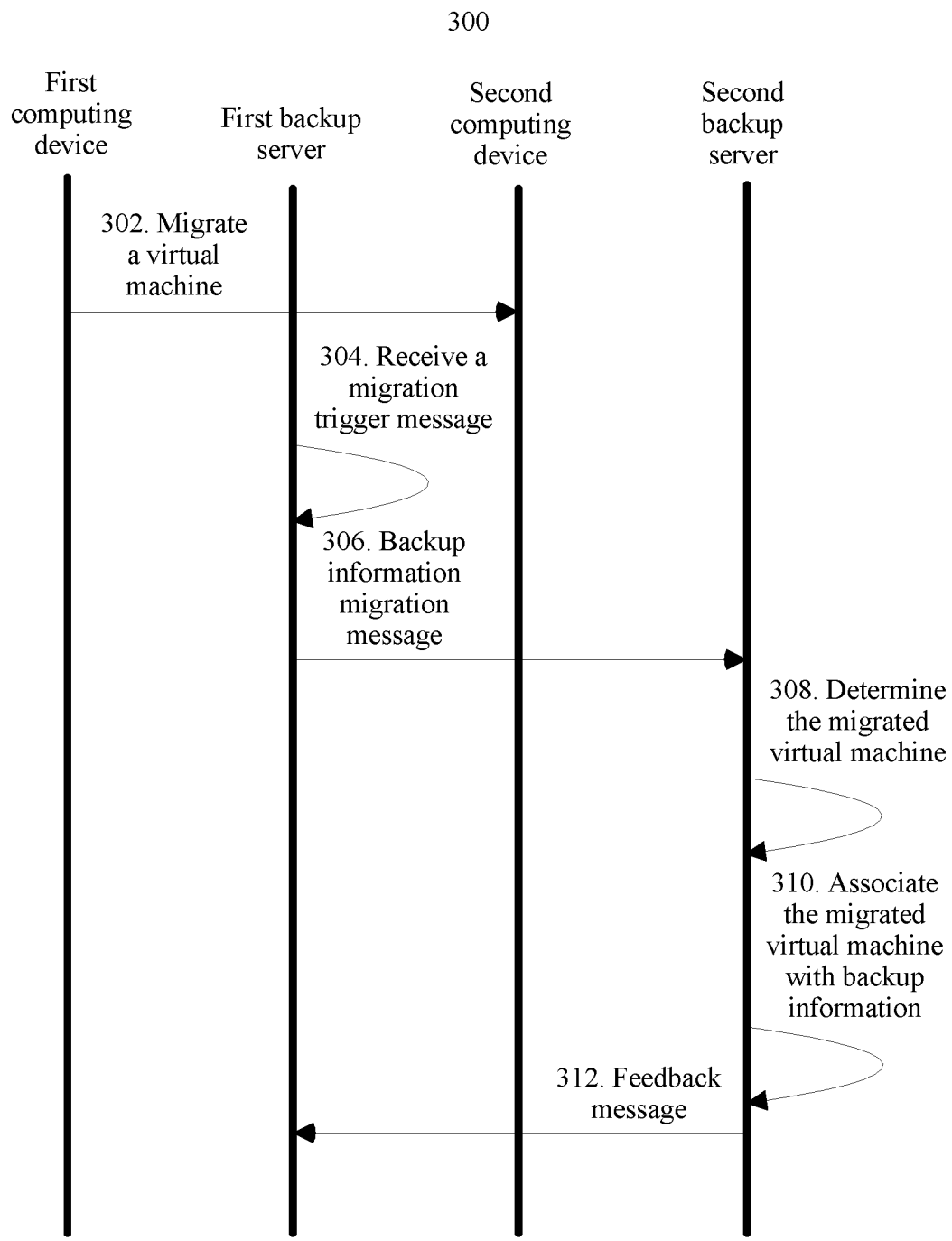
FIG. 3 is a signaling diagram of a method for migrating virtual machine backup information according to an embodiment of the present disclosure.

FIG. 1(b) is an exemplary block diagram of a system for migrating virtual machine backup information according to an embodiment of the present disclosure. As shown in FIG. 1(b), a first virtual machine group 102 and a second virtual machine group 104 are located in a same data center 118; a migration management module 120 is configured to manage a migration operation on a virtual machine in the data center 118; a first computing device and a second computing device respectively belong to two different virtual machine groups, the first virtual machine group 102 and the second virtual machine group 104; a first backup server 110 is configured to manage a data backup of a virtual machine in the first virtual machine group 102; and a second backup server 112 is configured to manage a data backup of a virtual machine in the second virtual machine group 104. A signaling diagram of a backup information migration process for the virtual machine 116 is shown in FIG. 3, where the backup information migration process for the virtual machine includes:

302. The migration management module 120 migrates the virtual machine 116 from the first computing device to the second computing device.

The migration management module 120 of the data center 118 starts a migration operation of the virtual machine 116, and is responsible for migrating information of the virtual machine 116, such as configuration information and a data volume, from the first computing device to the second computing device.

304. The first backup server 110 receives a migration trigger message.

It should be understood that there may be no order between step 302 and step 304. To reduce waiting time during which backup information is being prepared, a migration notification message may be sent to the first backup server 110 in advance.

Identification information of the virtual machine changes after migration. For ease of description, in the following description, identification information of the virtual machine 116 on the first computing device is referred to as pre-migration virtual-machine identification information, and identification information of the virtual machine 116 on the second computing device is post-migration virtual-machine identification information.

The migration trigger message carries the pre-migration virtual-machine identification information and indication information of the second backup server 112, where the migration trigger message is used to instruct the first backup server 110 to send backup information of the virtual machine 116 to the second backup server.

In a specific implementation process, the pre-migration virtual-machine identification information may include a host ID of the first computing device and a virtual machine identifier (VMID) of the virtual machine 116 on the first computing device. The pre-migration virtual-machine identification information may further be address information of the virtual machine on the first computing device.

It should be understood that the pre-migration virtual-machine identification information is for indication of the identification information of the virtual machine 116 on the first computing device, such that the first backup server 110 uniquely determines the virtual machine 116, and this embodiment of the present disclosure imposes no limitation on a specific implementation manner of the pre-migration virtual-machine identification information.

The indication information of the second backup server 112 may be address information or a host ID of the second backup server 112.

Optionally, the indication information of the second backup server 112 is an identifier of the second computing device. The first backup server 110 determines the second backup server 112 according to the identifier of the second computing device and a first correspondence, where the first correspondence includes a correspondence between the second computing device and the second backup server 112. In a specific implementation process, the first backup server 110 may maintain the first correspondence, or a management server may maintain the first correspondence. The first backup server 110 may query, in the management server, address information, host ID information, or the like of the second backup server 112 corresponding to the second computing device.

The migration trigger message received by the first backup server 110 may be a migration trigger message from the migration management module 120. After migrating the virtual machine 116 from the first computing device to the second computing device, the migration management module 120 sends the migration trigger message to the first backup server 110, so as to instruct the first backup server 110 to send the backup information of the virtual machine 116 to the second backup server 112. The migration management module 120 maintains a correspondence between each computing device and a backup server that are in the data center 118.

The migration trigger message received by the first backup server 110 may be a migration trigger message from the second backup server 112. After migrating the virtual machine 116 from the first computing device to the second computing device, the migration management module 120 sends indication information of the first backup server 110 and the pre-migration virtual-machine identification information to the second backup server 112. The second backup server 112 sends the migration trigger message to the first backup server 110, so as to instruct the first backup server 110 to send the backup information of the virtual machine 116 to the second backup server 112.

The indication information of the first backup server 110 may be a host ID or address information of the first backup server 110. The indication information of the first backup server 110 may further be an identifier of the first computing device. The second backup server 112 maintains a correspondence between the first computing device and the first backup server 110, and the second backup server 112 determines the first backup server 110 according to the correspondence and the identifier of the first computing device.

In an implementation manner of this embodiment of the present disclosure, the system shown in FIG. 1(b) further includes a backup server management platform. As shown in FIG. 1(d), the backup server management platform 130 is responsible for centralized management and scheduling of the first backup server 110 and the second backup server 112, monitors a virtual-machine migration event, and schedules virtual-machine backup information migration. The backup server management platform stores a correspondence between a computing device and a backup server.

The migration trigger message received by the first backup server 110 may be from the backup server management platform 130. After completing migration of the virtual machine 116, the migration management module 120 sends a migration notification message to the backup server management platform 130, where the migration notification message carries an identifier of the first computing device, an identifier of the second computing device, and the pre-migration virtual-machine identification information. The backup server management platform 130 determines the first backup server 110 according to the identifier of the first computing device, determines the second backup server 112 according to the identifier of the second computing device, and sends the migration trigger message to the first backup server 110.

The first backup server 110 determines the backup information of the virtual machine 116 according to the pre-migration virtual-machine identification information. The first backup server 110 is configured to back up the virtual machine 116 on the first computing device, and the backup information of the virtual machine 116 before the migration is maintained inside the first backup server 110, where the backup information of the virtual machine may be determined according to the pre-migration virtual-machine identification information.

Optionally, the backup information includes backup data information of and/or a backup policy for the virtual machine 116. If the first backup server 110 and the second backup server 112 share a storage device that is configured to store backup data of the virtual machine 116, the backup data information includes address information of the backup data of the virtual machine 116, in the storage device; or, if the first backup server 110 and the second backup server 112 do not share a storage device that is configured to store backup data of the virtual machine 116, the backup data information includes the backup data of the virtual machine 116.

It should be understood that a form of the migration trigger message is not limited in this embodiment of the present disclosure. For example, the first backup server 110 may not receive the pre-migration virtual-machine identification information and the indication information of the second backup server at the same time. For example, it may be that the first backup server 110 receives a notification message indicating that a virtual machine identified by the pre-migration virtual-machine identification information is migrated, and the first backup server 110 may query, in the migration management module 120, information about the second backup server 112.

306. The first backup server 110 sends a backup information migration message to the second backup server 112.

Before step 306, a mutual trust relationship is established between the first backup server 110 and the second backup server 112, and a communications connection between the first backup server 110 and the second backup server 112 is established.

The backup information migration message includes identification information of the virtual machine 116 and the backup information of the virtual machine 116.

The identification information, of the virtual machine 116, carried by the backup information migration message may be the pre-migration virtual-machine identification information.

The identification information, of the virtual machine 116, carried by the backup information migration message may be the post-migration virtual-machine identification information, where the post-migration virtual-machine identification information is the identification information of the virtual machine 116 on the second computing device. In a specific implementation process, the post-migration virtual-machine identification information may include a Host ID of the second computing device and a VMID of the virtual machine 116 on the second computing device. The post-migration virtual-machine identification information may further be address information of the virtual machine on the second computing device. A correspondence between the pre-migration virtual-machine identification information and the post-migration virtual-machine identification information may be sent by the migration management module 120, the second backup server 112, or the backup server management platform 130 to the first backup server 110.

It should be understood that the post-migration virtual-machine identification information is for indication of the identification information of the virtual machine 116 on the second computing device, such that the second backup server 112 uniquely determines the virtual machine 116, and this embodiment of the present disclosure imposes no limitation on a specific implementation manner of the post-migration virtual-machine identification information.

In a specific implementation process, that the first backup server 110 sends a backup information migration message to the second backup server 112 may be: the first backup server 110 sends the backup information migration message to the second backup server 112 using the migration management module 120, that is, the first backup server 110 sends the backup information migration message to the migration management module 120 (or the migration management module 120 acquires the backup information migration message from the first backup server 110), and the migration management module 120 sends the backup information migration message to the second backup server 112. It should be understood that this embodiment of the present disclosure imposes no limitation on a specific process of sending the backup information migration message by the first backup server 110 to the second backup server 112.

308. The second backup server 112 determines the virtual machine 116 according to identification information of the virtual machine 116.

If the identification information, of the virtual machine 116, carried by the backup information migration message is the pre-migration virtual-machine identification information, that the second backup server 112 determines the virtual machine 116 according to the pre-migration virtual-machine identification information is specifically: the second backup server 112 determines the post-migration virtual-machine identification information of the virtual machine according to the pre-migration virtual-machine identification information and a second correspondence, where the second correspondence includes a correspondence between the pre-migration virtual-machine identification information and the post-migration virtual-machine identification information.

Because after the virtual machine 116 is migrated from the first computing device to the second computing device, the pre-migration virtual-machine identification information of the virtual machine 116 on the first computing device differs from the post-migration virtual-machine identification information of the virtual machine 116 on the second computing device, the second backup server 112 needs to determine the post-migration virtual-machine identification information according to the pre-migration virtual-machine identification information.

In specific implementation of this embodiment of the present disclosure, the second backup server 112 sends a query message to the migration management module 120, where the query message includes the pre-migration virtual-machine identification information, and receives an acknowledgment message from the migration management module 120, where the acknowledgment message carries the post-migration virtual-machine identification information. The migration management module 120 stores the second correspondence, and may determine the post-migration virtual-machine identification information according to the second correspondence maintained by the migration management module 120 and the pre-migration virtual-machine identification information.

In an implementation manner of this embodiment of the present disclosure, after a virtual-machine migration event occurs, the migration management module 120 actively sends the second correspondence between the pre-migration virtual-machine identification information and the post-migration virtual-machine identification information to the second backup server 112.

If the identification information of the virtual machine 116 is the post-migration virtual-machine identification information, the second backup server 112 directly determines the virtual machine 116 according to the post-migration virtual-machine identification information.

310. The second backup server 112 associates the virtual machine 116 with backup information of the virtual machine 116.

Optionally, the backup information includes the backup data information of the virtual machine 116. If the first backup server 110 and the second backup server 112 share a storage device that is configured to store the backup data of the virtual machine 116, the backup data information includes address information of the backup data of the virtual machine 116, in the storage device, and the second backup server 112 associates the virtual machine 116 with a storage area indicated by the address information.

Optionally, before associating the virtual machine with the storage area indicated by the address information, the second backup server 112 further verifies whether the storage area indicated by the address information can be normally accessed, and verifies integrity and availability of backup data of the storage area. If the storage area indicated by the address information cannot be normally accessed, or the backup data of the storage area is incomplete or unavailable, the second backup server 112 may send error information to the migration management module 120 or the first backup server 110.

If the first backup server 110 and the second backup server 112 do not share a storage device that is configured to store the backup data of the virtual machine 116, the backup data information includes the backup data of the virtual machine 116. The second backup server 112 further creates a backup data storage area for the backup data, and stores received backup data into the created backup data storage area.

Optionally, the backup information includes a backup policy. After receiving the backup information migration message from the first backup server 110, the second backup server 112 determines whether the second backup server 112 has a backup policy in the backup information migration message. If the second backup server 112 does not have a backup policy in the backup information migration message, the second backup server 112 creates the backup policy, and associates the virtual machine 116 with the backup policy.

After associating the virtual machine 116 with the backup information, the second backup server 112 further formulates a backup plan for the virtual machine 116 according to the backup information.

For example, a restoration processing process is determined, where the restoration processing process includes: when data is faulty, determining a processing process that should be followed, backups used to restore a faulty application program and data, a time point to which the faulty data should be restored, and a requirement for a restoration speed. A corresponding backup storage medium, storage manner, and transmission medium that need to be used depend on a speed of data backup restoration. A data backup restoration plan with comprehensive consideration and thorough execution is the most important basic condition of ensuring that restoration can succeed after a data disaster occurs.

For another example, backup data validity is verified. After a data backup is completed, it does not indicate that the backed-up data can certainly be used when required. Therefore, in the backup plan, a specific backup data validity checking plan may be specified, and a backup data validity checking manner is determined. Only when backup data validity is ensured, it can be ensured that after a system or a device is faulty, data stored in the system or the device can be effectively restored.

For another example, how to prevent abnormality in a backup operation process is determined. When data is being backed up, it cannot be ensured that no error will occur in each data backup process. In a data backup process, a mechanical fault of a backup server or a storage device may occur, and an outage or another case may occur in a backup process. These accidental cases cause interruption of a backup task. Therefore, when a data backup plan is being formulated, probabilities of occurrences of these cases and how to handle these cases may be considered.

For another example, a life cycle of data is determined. Any data has a life cycle, that is, a complete cycle that includes generation, use, storage, and destruction that are of the data. Because data types and significance of virtual machines are not completely the same, it is necessary to determine life cycles of different backup data and how to securely destroy the backup data when the backup data is out of use. Determining a life cycle of data is to determine a capacity of a backup storage medium, and a longer life cycle of the data requires a larger capacity of the storage medium.

It should be understood that this embodiment of the present disclosure only gives an example of the backup plan, and there may be various backup plans according to different functions of a virtual machine. Different backup plans may include more or less content, and this embodiment of the present disclosure imposes no limitation thereto.

312. The second backup server 112 sends a feedback message to the first backup server 110.

The feedback message is used to indicate completion of migration of the backup information. After receiving the feedback message from the second backup server 112, the first backup server 110 may tear down a communications connection to the second backup server, so as to release a communication resource, and may delete original backup data of the virtual machine, so as to release a storage resource of the first backup server.

According to the technical solution disclosed in this embodiment of the present disclosure, in a same data center, when a virtual machine is migrated from a first computing device to a second computing device, where the first computing device and the second computing device have different backup servers, backup information migration is implemented between two backup servers, such that after being migrated to a new location, the virtual machine can inherit backup data that is of the virtual machine and exists before the migration, and therefore the migrated virtual machine continues to be protected by the backup data existing before the migration. In addition, by means of backup policy migration, a backup server of the second computing device can back up data of the virtual machine according to a backup policy existing before the migration.

FIG. 1(c) is an exemplary block diagram of a system for migrating virtual machine backup information according to an embodiment of the present disclosure. As shown in FIG. 1(c), a first virtual machine group 102 and a second virtual machine group 104 are respectively located in two different data centers: a first data center 122 and a second data center 124. A first migration management module 126 is configured to manage a migration operation on a virtual machine in the first data center 122, and a second migration management module 128 is configured to manage a migration operation on a virtual machine in the second data center 124. A first computing device and a second computing device respectively belong to the first virtual machine group 102 and the second virtual machine group 104. A first backup server 110 is configured to manage a data backup of a virtual machine in the first virtual machine group 102, and a second backup server 112 is configured to manage a data backup of a virtual machine in the second virtual machine group 104. A virtual machine 116 is migrated from the first computing device to the second computing device. A backup information migration process of the virtual machine 116 includes:

S402. The first migration management module 126 and the second migration management module 128 migrate the virtual machine 116 from the first computing device to the second computing device.

In a specific implementation process, the first migration management module 126 may trigger a migration operation of the virtual machine 116, and migrates information, such as configuration information and a data volume, of the virtual machine 116 from the first computing device to the second computing device by interacting with the second migration management module 128 in the second data center 124.

S404. The first backup server 110 receives a migration trigger message.

It should be understood that there is no sequence between step S402 and step S404. To reduce waiting time during which backup information is being prepared, a migration notification message may be sent to the first backup server 110 in advance.

The migration trigger message has been described in the embodiment corresponding to FIG. 3, and details are not described herein again.

In this embodiment of the present disclosure, indication information of the second backup server 112 may further be an identifier of the second data center 124. The first backup server may determine the second backup server according to a preset correspondence and the identifier of the second data center.

The migration trigger message received by the first backup server 110 may be a migration trigger message from the first migration management module 126. After migrating the virtual machine 116 from the first computing device to the second computing device, the first migration management module 126 sends the migration trigger message to the first backup server 110, so as to instruct the first backup server 110 to send backup information of the virtual machine 116 to the second backup server 112. The first migration management module 126 stores a correspondence between the first computing device and the first backup server 110. The first migration management module 126 may store a correspondence between the second computing device and the second backup server 112, or may acquire the indication information of the second backup server 112 from the second migration management module 128.

The migration trigger message received by the first backup server 110 may be from the second migration management module 128. The first migration management module 126 sends indication information of the first backup server 110 and pre-migration virtual-machine identification information of the virtual machine 116 to the second migration management module 128. The second migration management module 128 stores a correspondence between the second computing device and the second backup server 112.

The migration trigger message received by the first backup server 110 may be from the second backup server 112. The first migration management module 126 sends indication information of the first backup server 110 and pre-migration virtual-machine identification information of the virtual machine 116 to the second migration management module 128, and the second migration management module 128 sends the indication information of the first backup server 110 and the pre-migration virtual-machine identification information of the virtual machine 116 to the second backup server 112.

Alternatively, the first migration management module 126 may directly send indication information of the first backup server 110 and pre-migration virtual-machine identification information of the virtual machine 116 to the second backup server 112. The first migration management module 126 may store a correspondence between the second computing device and the second backup server 112, and the second migration management module 128 may send the indication information of the second backup server 112 to the first migration management module 126.

The indication information of the first backup server 110 may be an identifier of the first computing device. The second migration management module may store the correspondence between the first computing device and the first backup server 110, and determines the first backup server according to the correspondence and the identifier of the first computing device. Alternatively, the second backup server may store the correspondence, and the second backup server determines the first backup server according to the identifier of the first computing device and the correspondence.

In an implementation manner of this embodiment of the present disclosure, the system shown in FIG. 1(c) further includes a backup server management platform 130. As shown in FIG. 1(e), the backup server management platform 130 is responsible for centralized management and scheduling of the first backup server 110 and the second backup server 112, monitors a virtual-machine migration event, and schedules virtual-machine backup information migration. The backup server management platform stores a correspondence between a computing device and a backup server.

The migration trigger message received by the first backup server 110 may be from the backup server management platform 130. The first migration management module 126 or the second migration management module 128 sends a migration notification message to the backup server management platform 130, where the migration notification message carries an identifier of the first computing device, an identifier of the second computing device, and pre-migration virtual-machine identification information. The backup server management platform 130 determines the first backup server 110 according to the identifier of the first computing device, determines the second backup server 112 according to the identifier of the second computing device, and sends the migration trigger message to the first backup server 110.

It should be understood that a form of the migration trigger message is not limited in this embodiment of the present disclosure. For example, the first backup server 110 may not receive the pre-migration virtual-machine identification information and the indication information of the second backup server 112 at the same time. For example, it may be that the first backup server 110 receives a notification message, where the notification message indicates that the virtual machine 116 indicated by the pre-migration virtual-machine identification information is migrated, and the first backup server 110 may query, in the first migration management module 126, the indication information of the second backup server 112.

The first backup server 110 determines the backup information of the virtual machine 116 according to the pre-migration virtual-machine identification information; for remaining steps, refer to description in steps 306 to 312; details are not described herein again.

In this embodiment of the present disclosure, that the second backup server 112 determines post-migration virtual-machine identification information according to the pre-migration virtual-machine identification information may be: the second backup server 112 sends a query message to the second migration management module 128, where the query message includes the pre-migration virtual-machine identification information; and receives an acknowledge message from the second migration management module 128, where the acknowledge message carries the post-migration virtual-machine identification information. The second migration management module 128 stores a second correspondence, and may determine the post-migration virtual-machine identification information according to the second correspondence maintained by the second migration management module 128 and the pre-migration virtual-machine identification information.

In an implementation manner of this embodiment of the present disclosure, after a virtual-machine migration event occurs, the second migration management module 128 actively sends the second correspondence between the pre-migration virtual-machine identification information and the post-migration virtual-machine identification information to the second backup server 112.

In a specific implementation process, that the first backup server 110 sends a backup information migration message to the second backup server 112 may be: the first backup server 110 sends the backup information migration message to the second backup server 112 using the first migration management module 126 and the second migration management module 128, that is, the first backup server 110 sends the backup information migration message to the first migration management module 126 (or the first migration management module 126 acquires the backup information migration message from the first backup server 110), the first migration management module 126 sends the backup information migration message to the second migration management module 128, and the second migration management module 128 sends the backup information migration message to the second backup server 112. It should be understood that this embodiment of the present disclosure imposes no limitation on a specific process of sending the backup information migration message by the first backup server 110 to the second backup server 112.

According to the technical solution disclosed in this embodiment of the present disclosure, when a virtual machine is migrated from a first computing device to a second computing device, where the first computing device and the second computing device are located in different data centers, backup information migration is implemented between two backup servers, such that after being migrated to a new location, the virtual machine can inherit backup data that is of the virtual machine and exists before the migration, and therefore the migrated virtual machine continues to be protected by the backup data existing before the migration. In addition, by means of backup policy migration, a backup server of the second computing device can back up data of the virtual machine according to a backup policy existing before the migration.

Figure 4:
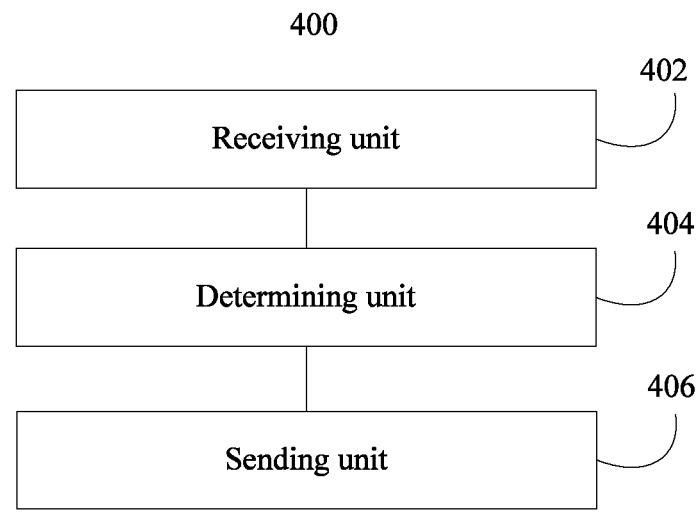
FIG. 4 is a schematic diagram of a logical structure of an apparatus for migrating virtual machine backup information according to an embodiment of the present disclosure.

FIG. 4 is a schematic diagram of a logical structure of an apparatus for migrating virtual machine backup information according to an embodiment of the present disclosure. After a virtual machine running on a first computing device is migrated to a second computing device, an apparatus 400 is configured to migrate backup information of the virtual machine to a backup server of the second computing device. As shown in FIG. 4, the apparatus 400 includes a receiving unit 402, a determining unit 404, and a sending unit 406.

The receiving unit 402 is configured to receive a migration trigger message, where the migration trigger message carries pre-migration virtual-machine identification information and indication information of the backup server, and the pre-migration virtual-machine identification information is used to indicate the virtual machine. The apparatus 400 is configured to back up data of a virtual machine running on the first computing device, and the backup server is configured to back up data of a virtual machine running on the second computing device.

In a specific implementation process, the receiving unit 402 may be implemented using the processor 202, the memory unit 204, and the communications interface 208 shown in FIG. 2. More specifically, the processor 202 may execute a communication module in the memory unit 204, such that the communications interface 208 receives the migration trigger message.

Optionally, that the receiving unit 402 is configured to receive a migration trigger message includes: the receiving unit 402 is configured to receive a migration trigger message from the backup server, where the migration trigger message is used to request the apparatus 400 to send backup information of the virtual machine to the backup server.

Optionally, that the receiving unit 402 is configured to receive a migration trigger message includes: the receiving unit 402 is configured to receive a migration trigger message from a migration management module, where the migration management module is configured to manage a migration operation of the virtual machine, and the migration trigger message is used to indicate that the virtual machine is migrated from the first computing device to the second computing device.

Optionally, that the receiving unit 402 is configured to receive a migration trigger message includes: the receiving unit 402 is configured to receive a migration trigger message from a backup server management platform, where the backup server management platform is configured to manage backup information migration between the apparatus 400 and the backup server.

The determining unit 404 is configured to determine the backup information of the virtual machine according to the pre-migration virtual-machine identification information.

In a specific implementation process, the determining unit 404 may be implemented using the processor 202 and the memory unit 204 shown in FIG. 2, and more specifically, the processor 202 may execute a backup module in the memory unit 204 to determine the backup information of the virtual machine.

The sending unit 406 is configured to send a backup information migration message to the backup server, where the backup information migration message carries the backup information and virtual-machine identification information.

In a specific implementation process, the sending unit 406 may be implemented using the processor 202, the memory unit 204, and the communications interface 208 shown in FIG. 2. More specifically, the processor 202 may execute a communication module in the memory unit 204, such that the communications interface 208 sends the backup information migration message to the backup server.

Optionally, the indication information of the backup server is an identifier of the second computing device, and before the sending unit 406 sends the backup information migration message to the backup server, the determining unit 404 is further configured to: determine the backup server according to the identifier of the second computing device and a first correspondence, where the first correspondence includes a correspondence between the second computing device and the backup server.

Optionally, the backup information includes backup data information and/or a backup policy that are/is of the virtual machine. If the apparatus 400 and the backup server share a storage device that is configured to store backup data of the virtual machine, the backup data information includes address information of the backup data of the virtual machine, in the storage device; or, if the apparatus 400 and the backup server do not share a storage device that is configured to store backup data of the virtual machine, the backup data information includes the backup data of the virtual machine.

Optionally, after the sending unit 406 sends the backup information migration message to the backup server, the receiving unit 402 is further configured to receive a feedback message from the backup server, where the feedback message is used to indicate completion of migration of the backup information.

This embodiment of the present disclosure is an apparatus embodiment of the first backup server 110. Feature description in embodiments of FIG. 1(*a*) to FIG. 1(*e*) to FIG. 3 is applicable to this embodiment of the present disclosure, and details are not described herein again.

Figure 5:
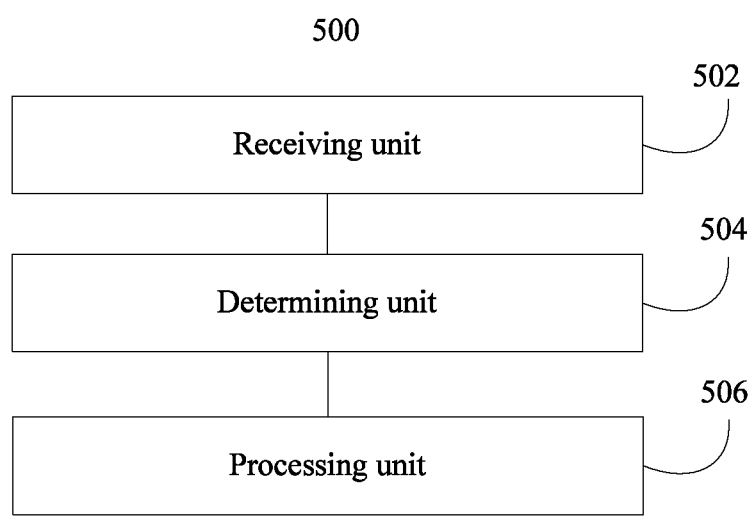
FIG. 5 is a schematic diagram of a logical structure of an apparatus for migrating virtual machine backup information according to an embodiment of the present disclosure.

FIG. 5 is a schematic diagram of a logical structure of an apparatus for migrating virtual machine backup information according to an embodiment of the present disclosure. After a virtual machine running on a first computing device is migrated to a second computing device, an apparatus 500 is configured to migrate backup information of the virtual machine from a first backup server of the first computing device to the apparatus 500. As shown in FIG. 5, the apparatus 500 includes a receiving unit 502, a determining unit 504, and a processing unit 506.

The receiving unit 502 is configured to receive a backup information migration message from the backup server, where the backup information migration message includes virtual-machine identification information and backup information of the virtual machine, and the virtual-machine identification information is used to indicate the virtual machine. The backup server is configured to back up data of a virtual machine running on the first computing device, and the apparatus 500 is configured to back up data of a virtual machine running on the second computing device.

Optionally, the virtual-machine identification information may be pre-migration virtual-machine identification information or post-migration virtual-machine identification information.

In a specific implementation process, the receiving unit 502 may be implemented using the processor 202, the memory unit 204, and the communications interface 208 shown in FIG. 2. More specifically, the processor 202 may execute a communication module in the memory unit 204, such that the communications interface 208 receives the backup information migration message from the backup server.

Optionally, before receiving the backup information migration message from the backup server, the receiving unit 502 is further configured to receive a notification message from a migration management module, where the notification message carries indication information of the backup server and the pre-migration virtual-machine identification information, and the migration management module is configured to manage a migration operation of the virtual machine. The apparatus 500 further includes a sending unit, configured to send a migration trigger message to the backup server, where the migration trigger message is used to request the backup server to send the backup information of the virtual machine to the apparatus 500, and the migration trigger message carries the pre-migration virtual-machine identification information and indication information of the apparatus 500.

The determining unit 504 is configured to determine the virtual machine according to the virtual-machine identification information.

In a specific implementation process, the determining unit 504 may be implemented using the processor 202 and the memory unit 204 shown in FIG. 2, and more specifically, the processor 202 may execute a backup module in the memory unit 204 to determine the virtual machine according to the pre-migration virtual-machine identification information.

Optionally, the virtual-machine identification information is the pre-migration virtual-machine identification information; that the determining unit 504 is configured to determine the virtual machine according to the virtual-machine identification information includes: the determining unit 504 is configured to determine the post-migration virtual-machine identification information of the virtual machine according to the pre-migration virtual-machine identification information and a second correspondence, where the post-migration virtual-machine identification information is identification information of the virtual machine on the second computing device, and the second correspondence includes a correspondence between the pre-migration virtual-machine identification information and the post-migration virtual-machine identification information.

Optionally, the apparatus 500 further includes a sending unit, and that the determining unit 504 is configured to determine the virtual machine according to the virtual-machine identification information includes: the determining unit 504 is configured to send a query message to the migration management module using the sending unit, where the query message includes the pre-migration virtual-machine identification information, and the migration management module is configured to manage a migration operation of the virtual machine and store the second correspondence. The determining unit 504 is configured to receive an acknowledgment message from the migration management module using the receiving unit 502, where the acknowledgment message includes the post-migration virtual-machine identification information.

Optionally, the backup information includes backup data information of the virtual machine. If the backup server and the apparatus 500 share a storage device that is configured to store backup data of the virtual machine, the backup data information includes address information of the backup data of the virtual machine, in the storage device; or, if the backup server and the apparatus 500 do not share a storage device that is configured to store backup data of the virtual machine, the backup data information includes the backup data of the virtual machine.

The processing unit 506 is configured to associate the virtual machine with the backup information.

In a specific implementation process, the processing unit 506 may be implemented using the processor 202 and the memory unit 204 shown in FIG. 2, and more specifically, the processor 202 may execute a backup module in the memory unit 204 to associate the virtual machine with the backup information.

Optionally, after associating the virtual machine with the backup information, the processing unit 506 is further configured to formulate a backup plan for the virtual machine according to the backup information.

Optionally, after the processing unit 506 associates the virtual machine with the backup information, the sending unit is further configured to send a feedback message to the backup server, where the feedback message is used to indicate completion of migration of the backup information.

This embodiment of the present disclosure is an apparatus embodiment of the second backup server 112. Feature description in embodiments of FIG. 1(*a*) to FIG. 1(*e*) to FIG. 3 is applicable to this embodiment of the present disclosure, and details are not described herein again.

Figure 6:
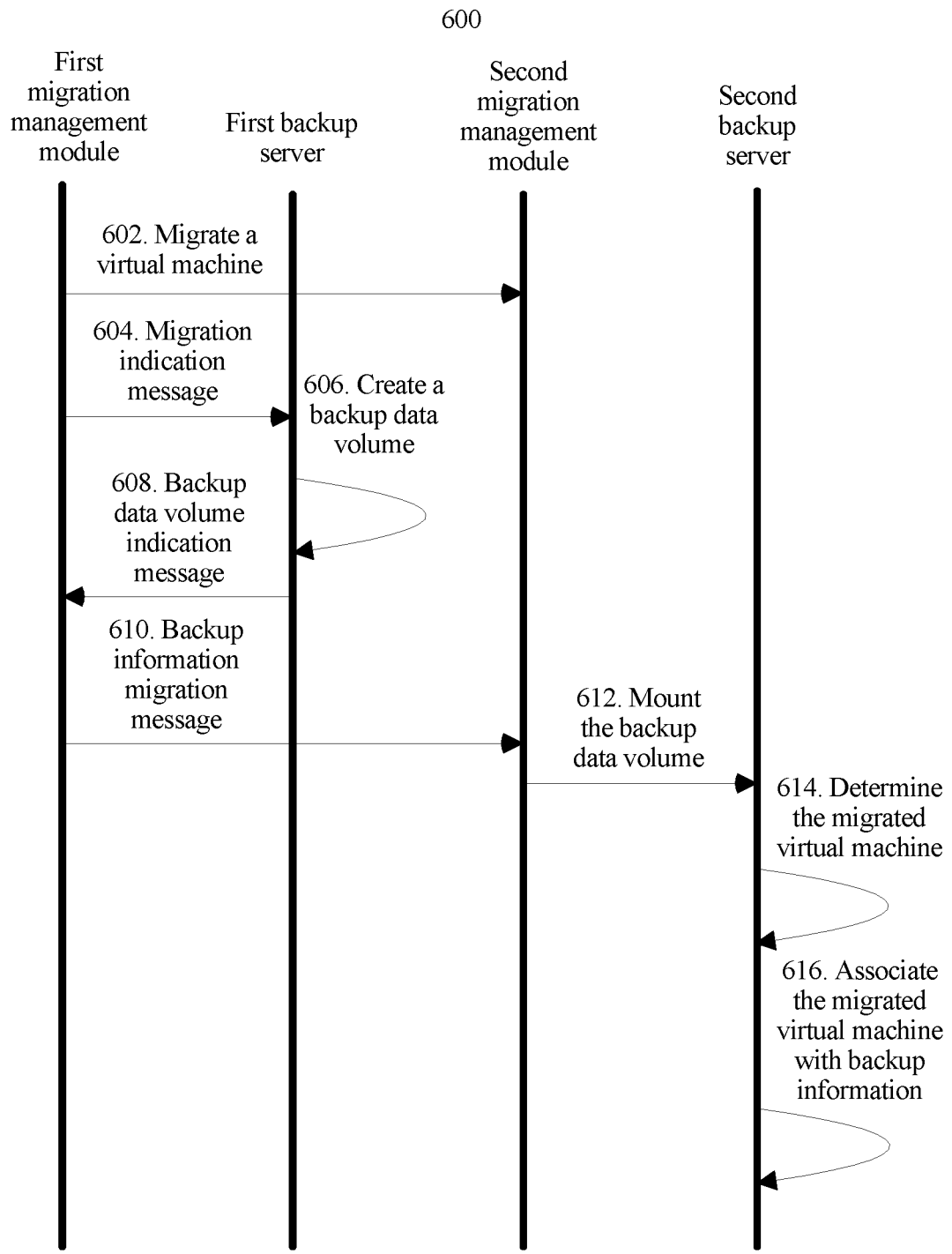
FIG. 6 is a signaling diagram of a method for migrating virtual machine backup information according to an embodiment of the present disclosure.

In scenarios of FIG. 1(*c*) and FIG. 1(*e*), a process shown in FIG. 6 may be used to perform backup information migration. FIG. 6 is a signaling diagram of a method for migrating virtual machine backup information according to an embodiment of the present disclosure. As shown in FIG. 6, the method includes:

602. A first migration management module 126 and a second migration management module 128 migrate a virtual machine 116 from a first data center to a second data center.

604. The first migration management module 126 sends a migration notification message to a first backup server 110.

The migration notification message carries pre-migration virtual-machine identification information of the virtual machine 116, and is used to indicate that the virtual machine 166 is migrated.

It should be understood that there may be no sequence between step 602 and step 604. To reduce waiting time during which backup information is being prepared, the first migration management module 126 may send the migration notification message to the first backup server 110 in advance.

606. The first backup server 110 creates a backup data volume and saves backup information of the virtual machine 116 into the backup data volume.

After receiving the migration notification message, the first backup server 110 creates a backup data volume according to the migration notification message, where the backup data volume includes virtual-machine identification information and the backup information that are of the virtual machine 116. The virtual-machine identification information may be the pre-migration virtual-machine identification information or post-migration virtual-machine identification information. A method for acquiring the post-migration virtual-machine identification information by the first backup server has been described in the foregoing embodiments, and details are not described herein again.

608. The first backup server 110 sends a backup data volume indication message to the first migration management module 126.

The backup data volume indication message is used to indicate the backup data volume.

610. The first migration management module 126 sends a backup information migration message to the second migration management module 128.

After receiving the backup data volume indication message sent by the first backup server 110, the first migration management module 126 generates the backup information migration message according to the backup data volume.

Optionally, the backup information migration message includes the backup data volume and indication information of a second backup server 112.

Optionally, the backup information migration message includes the backup data volume and a backup server identifier, where the backup server identifier is used to indicate that a destination of the backup data volume is a backup server. In a specific implementation process, a field that records a virtual machine identifier when a virtual-machine data volume is migrated between migration management modules may be used for recording the backup server identifier.

612. The second migration management module 128 mounts the backup data volume to a second backup server 112.

If the backup information migration message carries the indication information of the second backup server 112, the second migration management module 128 determines the second backup server 112 according to the indication information of the second backup server 112, and mounts the backup data volume to the second backup server 112.

If the backup information migration message carries a backup server identifier, it indicates that the backup data volume is a data volume that stores virtual-machine backup data, and the second migration management module 128 determines that the backup data volume carries the backup information of the virtual machine, determines the second backup server 112 according to the virtual-machine identification information carried in the backup information migration message (if the virtual-machine identification information is the pre-migration virtual-machine identification information, the second backup server 112 further determines the post-migration virtual-machine identification information according to the pre-migration virtual-machine identification information), and mounts the backup data volume to the second backup server 112. The second migration management module 128 maintains a correspondence between a virtual machine and a backup server, and the pre-migration virtual-machine identification information and the post-migration virtual-machine identification information.

614. The second backup server 112 acquires virtual-machine identification information of the virtual machine 116 from the backup data volume, and determines the virtual machine 116.

If the virtual-machine identification information is the pre-migration virtual-machine identification information, the second backup server 112 determines the post-migration virtual-machine identification information according to the pre-migration virtual-machine identification information of the virtual machine 116. Specific description of determining the post-migration virtual-machine identification information by the second backup server 112 according to the pre-migration virtual-machine identification information has been described in the embodiment corresponding to FIG. 4, and details are not described herein again.

616. The second backup server 112 associates the virtual machine 116 with the backup information of the virtual machine 116.

Specifically, the second backup server 112 associates the virtual machine 116 indicated by the post-migration virtual-machine identification information with the backup information.

Optionally, the second migration management module 128 further sends a feedback message to the first migration management module, where the feedback message is used to indicate completion of migration of the backup information.

It should be understood that the embodiment corresponding to FIG. 6 is another implementation manner of the scenarios of FIG. 1(*c*) and FIG. 1(*e*); therefore, the foregoing feature description for FIG. 1(*c*) and FIG. 1(*e*) is applicable to this embodiment of the present disclosure, and details are not described herein again.

According to the technical solution disclosed in this embodiment of the present disclosure, a data volume migrating capability of a migration management module is used to implement virtual-machine backup information migration between different data centers. Backup information migration is implemented between two backup servers, such that after being migrated to a new location, a virtual machine can inherit backup data that is of the virtual machine and exists before the migration, and therefore, the migrated virtual machine continues to be protected by the backup data existing before the migration. In addition, by means of backup policy migration, a backup server of a second computing device can back up data of the virtual machine according to a backup policy existing before the migration.

In the several embodiments provided in this application, it should be understood that the disclosed system, device, and method may be implemented in other manners. For example, the described apparatus embodiment is merely exemplary. For example, the module division is merely logical function division and may be other division in implementation. For example, a plurality of modules or components may be combined or integrated into another system, or some features may be ignored or not performed. In addition, the displayed or discussed mutual couplings or direct couplings or communication connections may be implemented using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual requirements to achieve the objectives of the solutions of the embodiments.

In addition, functional modules in the embodiments of the present disclosure may be integrated into one processing module, or each of the modules may exist alone physically, or two or more modules are integrated into one module. The integrated module may be implemented in a form of hardware, or may be implemented in a form of hardware in addition to a software functional module.

When the foregoing integrated module is implemented in a form of a software functional module, the integrated module may be stored in a computer-readable storage medium. The software functional module is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a removable hard disk, a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present disclosure.

What is claimed is:

1. A system for migrating virtual machine backup information, comprising:
   a first backup server for backing up data of a virtual machine before the virtual machine has been migrated from a first computing device to a second computing device, wherein the first computing device and the second computing device belong to two different virtual machine groups;
   a second backup server for backing up data of the virtual machine while the virtual machine is migrating from the first computing device to the second computing device; and
   a migration management circuit for initiating and managing a migration operation of the virtual machine,
   wherein the first backup server is configured to:
   after the migration management circuit initiates the migration operation of the virtual machine, receive a migration trigger message sent by the second backup server, wherein the migration trigger message includes: pre-migration virtual-machine identification information, and indication information of the second backup server;
   identify backup information of the virtual machine according to the pre-migration virtual-machine identification information; and
   send a backup information migration message to the second backup server, wherein the backup information migration message includes the backup information and virtual-machine identification information, and
   wherein the second backup server is configured to:
   receive a notification message from the migration management circuit;
   send the migration trigger message to the first backup server based on the notification message, wherein the notification message includes: indication information of the first backup server, and the pre-migration virtual machine identification information, and wherein the migration trigger message sent by the second backup server is used to instruct the first backup server to migrate the backup information of the virtual machine to the second backup server;
   after the receiving, by the second backup server, the notification message from the migration management circuit, and the sending, by the second backup server, the migration trigger message to the first backup server based on the notification message, receive the backup information migration message from the first backup server;
   identify the virtual machine according to the virtual-machine identification information; and
   associate the virtual machine with the backup information.

2. The system according to claim 1, wherein the migration trigger message is sent by the migration management circuit after the migration management circuit initiates the migration operation of the virtual machine.

3. The system according to claim 1, wherein the migration trigger message further includes an identifier of the second computing device, and wherein the first backup server is further configured to identify the second backup server based on the identifier of the second computing device and a first correspondence between the second computing device and the second backup server.

4. The system according to claim 1, wherein the virtual-machine identification information is the pre-migration virtual-machine identification information, and wherein the second backup server is configured to determine post-migration virtual-machine identification information of the virtual machine according to the pre-migration virtual-machine identification information and a second correspondence, wherein the second correspondence comprises a correspondence between the pre-migration virtual-machine identification information and the post-migration virtual-machine identification information.

5. The system according to claim 1, wherein each of the two different virtual machine groups have a respective backup server.

6. The system according to claim 1, wherein backup information cannot be shared by virtual machines of the two different virtual machine groups.

7. The system according to claim 1, wherein the migration management circuit is configured to send the notification message to the second backup server after the virtual machine is migrated from the first computing device to the second computing device, and wherein the notification message is used to identify that a new virtual machine is migrated to the second computing device managed by the second backup server.

8. The system according to claim 1, wherein when the first computing device and the second computing device are located in a same data center, the migration management circuit is configured to send: the indication information of the first backup server, and the pre-migration virtual-machine identification information, to the second backup server after migrating the virtual machine from the first computing device to the second computing device.

9. The system according to claim 1, wherein the migration management circuit includes a first migration management circuit of a first data center and a second migration management circuit of a second data center different from the first data center, and wherein when the first computing device is located in the first data center and the second computing device is located in the second data center:
   the first migration management circuit is configured to send indication information of the first backup server and the pre-migration virtual-machine identification information of the virtual machine to the second migration management circuit; and
   the second migration management circuit is configured to send indication information of the first backup server and the pre-migration virtual-machine identification information of the virtual machine to the second backup server.

10. The system according to claim 1, wherein when the first backup server and the second backup server share a storage device configured to store backup data of the virtual machine, the backup data information identified by the first backup server includes storage device address information of the backup data of the virtual machine.

11. A method for migrating virtual machine backup information, comprising:
   initiating, by a migration management circuit, a migration operation of a virtual machine;
   after the migration management circuit initiates the migration operation of the virtual machine, receiving, by a first backup server, a migration trigger message sent by a second backup server, wherein the migration trigger message includes: pre-migration virtual-machine identification information, and indication information of the second backup server, wherein the first backup server is used to back up data of the virtual machine before the virtual machine has been migrated from a first computing device to a second computing device, and wherein the first computing device and the second computing device belong to two different virtual machine groups;

identifying, by the first backup server, backup information of the virtual machine according to the pre-migration virtual-machine identification information;

sending, by the first backup server, a backup information migration message to the second backup server, wherein the backup information migration message includes the backup information and virtual-machine identification information, and wherein the second backup server is used to back up data of the virtual machine while the virtual machine is migrating from the first computing device to the second computing device;

receiving, by the second backup server, a notification message from the migration management circuit;

sending, by the second backup server, the migration trigger message to the first backup server based on the notification message, wherein the notification message includes: indication information of the first backup server, and the pre-migration virtual machine identification message, and wherein the migration trigger message sent by the second backup server is used to instruct the first backup server to migrate the backup information of the virtual machine to the second backup server;

after the receiving, by the second backup server, the notification message from the migration management circuit, and the sending, by the second backup server, the migration trigger message to the first backup server based on the notification message, receiving, by the second backup server, the backup information migration message from the first backup server;

identifying, by the second backup server, the virtual machine according to the virtual-machine identification information; and associating, by the second backup server, the virtual machine with the backup information.

12. The method according to claim 11, wherein the migration trigger message is sent by the migration management circuit after the migration management circuit initiates the migration operation of the virtual machine, and wherein the migration management circuit is used to manage a migration operation of the virtual machine.

13. The method according to claim 11, wherein the migration trigger message further includes an identifier of the second computing device, the method further comprising:

identifying, by the first backup server, the second backup server based on the identifier of the second computing device and a first correspondence between the second computing device and the second backup server.

14. The method according to claim 11, wherein the virtual-machine identification information is the pre-migration virtual-machine identification information, the method further comprising:

determining, by the second backup server, post-migration virtual-machine identification information of the virtual machine according to the pre-migration virtual-machine identification information and a second correspondence between the pre-migration virtual-machine identification information and the post-migration virtual-machine identification information.

15. An apparatus for migrating virtual machine backup information, comprising:

a memory configured to store instructions; and a processor coupled to the memory and configured to execute the instructions to:

after a migration management circuit initiates a migration operation of a virtual machine, receive a migration trigger message sent by another apparatus, wherein the migration trigger message includes: pre-migration virtual-machine identification information, and indication information for the another apparatus, wherein the migration trigger message sent by the another apparatus is used to instruct the apparatus to migrate the backup information of the virtual machine to the another apparatus, wherein the apparatus is used to back up data of the virtual machine before the virtual machine has been migrated from a first computing device to a second computing device, and wherein the first computing device and the second computing device belong to two different virtual machine groups;

identify backup information of the virtual machine according to the pre-migration virtual-machine identification information;

after the another apparatus receives a notification message from the migration management circuit, and sends the migration trigger message to the apparatus based on the notification message, send a backup information migration message to the another apparatus, wherein the backup information migration message includes the backup information and virtual-machine identification information, and wherein the another apparatus is used to back up data of the virtual machine while the virtual machine is migrating.

16. The apparatus according to claim 15, wherein the migration trigger message is sent by the migration management circuit after the migration management circuit initiates the migration operation of the virtual machine, and wherein the migration management circuit is used to manage the migration operation of the virtual machine.

17. An apparatus for receiving virtual machine backup information, comprising:

a memory configured to store instructions; and a processor coupled to the memory and configured to execute the instructions to:

receive a notification message from a migration management circuit;

after the migration management circuit initiates a migration operation of a virtual machine, send a migration trigger message to another apparatus based on the notification message, wherein the notification message includes: indication information of the another apparatus, and pre-migration virtual machine identification information, and wherein the migration trigger message sent by the apparatus is used to instruct the another apparatus to migrate the backup information of the virtual machine to the apparatus;

after the receiving the notification message from the migration management circuit, and the sending the migration trigger message to the another apparatus based on the notification message, receive a backup information migration message from the another apparatus, wherein the another apparatus is used to back up data of the virtual machine before the virtual machine has been migrated from a first computing device to a second computing device, wherein the first computing device and the second computing device belong to two different virtual machine groups, wherein the apparatus is used to back up data of the virtual machine while the virtual machine is migrating from the first computing device to the second computing device, and wherein the backup information migration message includes backup information and virtual-machine identification information;

identify the virtual machine according to the virtual-machine identification information; and associate the virtual machine with the backup information.

18. The apparatus according to claim 17, wherein the migration trigger message is sent by the migration management circuit after the migration management circuit initiates the migration operation of the virtual machine, and wherein the migration management circuit is used to manage the migration operation of the virtual machine.

19. The apparatus according to claim 17, wherein the migration trigger message further includes an identifier of the second computing device, and wherein the processor is further configured to identify the apparatus based on the identifier of the second computing device and a first correspondence between the second computing device and the apparatus.

20. The apparatus according to claim 17, wherein the virtual-machine identification information is the pre-migration virtual-machine identification information, and wherein the processor is further configured to determine post-migration virtual-machine identification information of the virtual machine according to the pre-migration virtual-machine identification information and a second correspondence between the pre-migration virtual-machine identification information and the post-migration virtual-machine identification information.

* * * * *